(12) United States Patent
Balasubramanian et al.

(10) Patent No.: US 11,849,422 B2
(45) Date of Patent: Dec. 19, 2023

(54) SECURITY TECHNIQUES FOR RANGING IN WIRELESS NETWORKS

(71) Applicant: QUALCOMM Incorporated, San Diego, CA (US)

(72) Inventors: Anantharaman Balasubramanian, San Diego, CA (US); Kapil Gulati, Belle Mead, NJ (US); Shuanshuan Wu, San Diego, CA (US); Hong Cheng, Basking Ridge, NJ (US); Shailesh Patil, San Diego, CA (US); Gene Wesley Marsh, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/520,511

(22) Filed: Nov. 5, 2021

(65) Prior Publication Data
US 2023/0142626 A1    May 11, 2023

(51) Int. Cl.
*H04W 64/00*    (2009.01)
*G01S 5/02*    (2010.01)
*H04W 12/63*    (2021.01)

(52) U.S. Cl.
CPC ......... *H04W 64/003* (2013.01); *G01S 5/0289* (2013.01); *H04W 12/63* (2021.01)

(58) Field of Classification Search
CPC .... H04W 64/003; H04W 12/63; G01S 5/0289
See application file for complete search history.

(56) References Cited

U.S. PATENT DOCUMENTS

| | | | |
|---|---|---|---|
| 11,082,809 B1* | 8/2021 | Burowski | G01S 13/765 |
| 2017/0142682 A1* | 5/2017 | Gunnarsson | H04W 72/51 |
| 2017/0212206 A1 | 7/2017 | Kim et al. | |
| 2022/0110085 A1* | 4/2022 | Khoryaev | H04L 5/0051 |

FOREIGN PATENT DOCUMENTS

WO    WO-2021168657 A1    9/2021

OTHER PUBLICATIONS

International Search Report and Written Opinion—PCT/US2022/078458—ISA/EPO—Jan. 30, 2023 (2106418WO).

\* cited by examiner

*Primary Examiner* — Justin Y Lee
(74) *Attorney, Agent, or Firm* — Holland & Hart LLP

(57) ABSTRACT

Methods, systems, and devices for wireless communication are described to support security techniques for ranging in wireless networks. A first device may transmit an indication to initiate a ranging procedure with a second device, and in response to the indication, the second device may transmit signaling to the first device and to one or more third devices. The first device and the one or more third devices may each determine a respective location metric associated with the second device based on the signaling. The one or more third devices may each transmit, to the first device, the respective location metric. Based on the communicated location metric(s), the first device may determine whether an eavesdropper is present and may communicate with the second device based on the determination.

28 Claims, 11 Drawing Sheets

SECURITY TECHNIQUES FOR RANGING IN WIRELESS NETWORKS

FIELD OF TECHNOLOGY

The following relates to wireless communication, including security techniques for ranging in wireless networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a wireless device, such as a UE, may be a subject of an attack or a spoofed signal from a malicious device, which may be referred to as an eavesdropper.

SUMMARY

The described techniques relate to improved methods, systems, devices, and apparatuses that support security techniques for ranging in wireless networks. Generally, the described techniques provide for performance of cooperative secure ranging between multiple user equipments (UEs). A UE (e.g., a first device or initiating UE) may transmit an indication to initiate a ranging procedure with the target UE, and in response to the indication, the target UE may transmit signaling (e.g., one or more reference signals) to the initiating UE and to one or more cooperative UEs. The initiating UE and the one or more cooperative UEs may each determine a respective location metric associated with the target UE based on receiving the signaling. The one or more cooperative UEs may each transmit, to the initiating UE, the respective location metric (e.g., an angle of arrival, angle of departure, estimated location, estimated distance, or variation from an indicated location) associated with the transmitting UE. Based on the communicated location metric(s), the initiating UE may determine whether an eavesdropper is present and may communicate with the target UE based on the determination (e.g., may adjust or alter a communication link if an eavesdropper is determined to be present).

A method for wireless communication at a first device is described. The method may include transmitting, to a set of multiple devices, an indication to perform a ranging procedure with a second device, the set of multiple devices including the second device and one or more third devices, receiving signaling from the second device as part of the ranging procedure, where the first device determines an estimated location metric associated with the second device based on the received signaling, receiving, from each of the one or more third devices and based on performing the ranging procedure, a respective indication of a location metric for the second device relative to the each of the one or more third devices, and communicating with the second device based on the one or more respective indications of the location metric for the second device relative to the each of the one or more third devices.

An apparatus for wireless communication at a first device is described. The apparatus may include a processor, memory coupled with the processor, and instructions stored in the memory. The instructions may be executable by the processor to cause the apparatus to transmit, to a set of multiple devices, an indication to perform a ranging procedure with a second device, the set of multiple devices including the second device and one or more third devices, receive signaling from the second device as part of the ranging procedure, where the first device determines an estimated location metric associated with the second device based on the received signaling, receive, from each of the one or more third devices and based on performing the ranging procedure, a respective indication of a location metric for the second device relative to the each of the one or more third devices, and communicate with the second device based on the one or more respective indications of the location metric for the second device relative to the each of the one or more third devices.

Another apparatus for wireless communication at a first device is described. The apparatus may include means for transmitting, to a set of multiple devices, an indication to perform a ranging procedure with a second device, the set of multiple devices including the second device and one or more third devices, means for receiving signaling from the second device as part of the ranging procedure, where the first device determines an estimated location metric associated with the second device based on the received signaling, means for receiving, from each of the one or more third devices and based on performing the ranging procedure, a respective indication of a location metric for the second device relative to the each of the one or more third devices, and means for communicating with the second device based on the one or more respective indications of the location metric for the second device relative to the each of the one or more third devices.

A non-transitory computer-readable medium storing code for wireless communication at a first device is described. The code may include instructions executable by a processor to transmit, to a set of multiple devices, an indication to perform a ranging procedure with a second device, the set of multiple devices including the second device and one or more third devices, receive signaling from the second device as part of the ranging procedure, where the first device determines an estimated location metric associated with the second device based on the received signaling, receive, from each of the one or more third devices and based on performing the ranging procedure, a respective indication of a location metric for the second device relative to the each of the one or more third devices, and communicate with the second device based on the one or more respective indications of the location metric for the second device relative to the each of the one or more third devices.

Some examples of the method, apparatuses, and non-transitory computer-readable medium described herein may further include operations, features, means, or instructions for determining a validity of the estimated location metric associated with the second device based on the one or more respective indications of the location metric for the second device relative to the each of the one or more third devices, where the communicating may be based on the determined validity of the estimated location metric associated with the second device.

Some examples of the method, apparatuses, and non-transitory computer-readable medium described herein may further include operations, features, means, or instructions for receiving, from a network device, an indication of an expected location metric associated with the second device and an error tolerance for the expected location metric associated with the second device and determining whether the estimated location metric associated with the second device may be within the error tolerance of the expected location metric associated with the second device based on determining the estimated location metric.

Some examples of the method, apparatuses, and non-transitory computer-readable medium described herein may further include operations, features, means, or instructions for determining that the estimated location metric associated with the second device may be within the error tolerance of the expected location metric associated with the second device and determining that the estimated location metric associated with the second device may be valid based on determining that the estimated location metric associated with the second device may be within the error tolerance of the expected location metric associated with the second device.

In some examples of the method, apparatuses, and non-transitory computer-readable medium described herein, receiving the respective indication of the location metric for the second device from the one or more third devices may include operations, features, means, or instructions for receiving, from each of the one or more third devices, a respective indication of whether the location metric may be within a respective error tolerance of a respective expected location metric associated with the second device.

Some examples of the method, apparatuses, and non-transitory computer-readable medium described herein may further include operations, features, means, or instructions for determining that the estimated location metric associated with the second device may be outside of the error tolerance of the expected location metric associated with the second device and determining that the estimated location metric associated with the second device may be valid based on a first quantity of the one or more respective indications from the one or more third devices indicating that the location metric for the second device may be outside of the respective error tolerance of the respective expected location metric associated with the second device.

Some examples of the method, apparatuses, and non-transitory computer-readable medium described herein may further include operations, features, means, or instructions for determining that the estimated location metric associated with the second device may be outside of the error tolerance of the expected location metric associated with the second device and determining that the estimated location metric associated with the second device may be invalid based on a second quantity of the one or more respective indications from the one or more third devices indicating that the location metric for the second device may be within the respective error tolerance of the respective expected location metric associated with the second device.

Some examples of the method, apparatuses, and non-transitory computer-readable medium described herein may further include operations, features, means, or instructions for determining that the estimated location metric associated with the second device may be invalid based on the one or more respective indications from the one or more third devices and selecting one or more fourth devices to be included in the set of multiple devices based on determining that the estimated location metric associated with the second device may be invalid, the one or more fourth devices selected based on different devices of the one or more fourth devices being located in different directions from the second device.

Some examples of the method, apparatuses, and non-transitory computer-readable medium described herein may further include operations, features, means, or instructions for determining that the estimated location metric associated with the second device may be invalid based on the one or more respective indications from the one or more third devices and selecting one or more fourth devices to be included in the set of multiple devices based on determining that the estimated location metric associated with the second device may be invalid, each of the one or more fourth devices selected randomly from a set of devices associated with a shared key.

Some examples of the method, apparatuses, and non-transitory computer-readable medium described herein may further include operations, features, means, or instructions for determining that the estimated location metric associated with the second device may be invalid based on the one or more respective indications from the one or more third devices and dropping one or more communication links with the set of multiple devices based on determining that the estimated location metric associated with the second device may be invalid.

Some examples of the method, apparatuses, and non-transitory computer-readable medium described herein may further include operations, features, means, or instructions for performing, based on dropping the one or more communication links, a second ranging procedure with the set of multiple devices at a time offset from dropping the one or more communication links, the second ranging procedure based on a key shared by the set of multiple devices.

Some examples of the method, apparatuses, and non-transitory computer-readable medium described herein may further include operations, features, means, or instructions for determining that the estimated location metric associated with the second device may be invalid based on the one or more respective indications from the one or more third devices and performing, based on determining that the estimated location metric associated with the second device may be invalid, a second ranging procedure with the set of multiple devices, where signaling for the second ranging procedure may be based on a key shared by the set of multiple devices.

In some examples of the method, apparatuses, and non-transitory computer-readable medium described herein, receiving the respective indication of the location metric associated with the second device from the one or more third devices may include operations, features, means, or instructions for receiving, from each of the one or more third devices, a respective indication of a distance between the first device and the second device.

Some examples of the method, apparatuses, and non-transitory computer-readable medium described herein may further include operations, features, means, or instructions for combining the estimated location metric associated with the second device with the one or more indicated distances between the first device and the second device, where the estimated location metric associated with the second device may be a distance between the first device and the second device.

Some examples of the method, apparatuses, and non-transitory computer-readable medium described herein may further include operations, features, means, or instructions for transmitting, to the set of multiple devices, a request to use shortened signaling for the ranging procedure, where the shortened signaling may be based on a key shared by the set of multiple devices.

Some examples of the method, apparatuses, and non-transitory computer-readable medium described herein may further include operations, features, means, or instructions for transmitting, to the set of multiple devices, a request to use a quantity of repetitions of the shortened signaling for the ranging procedure, a request to use the key for randomization of the shortened signaling, or any combination thereof.

In some examples of the method, apparatuses, and non-transitory computer-readable medium described herein, a location metric associated with the second device includes a distance to the second device, an angle of arrival of signaling from the second device, an angle of departure of signaling to the second device, or any combination thereof.

A method for wireless communication at a third device is described. The method may include receiving, from a first device, an indication for a set of multiple devices to perform a ranging procedure with a second device, the set of multiple devices including the second device and one or more third devices that include the third device, receiving signaling from the second device as part of the ranging procedure, where a location metric associated with the second device is determined based on the received signaling, and transmitting, to the first device and based on performing the ranging procedure, an indication of the location metric associated with the second device.

An apparatus for wireless communication at a third device is described. The apparatus may include a processor, memory coupled with the processor, and instructions stored in the memory. The instructions may be executable by the processor to cause the apparatus to receive, from a first device, an indication for a set of multiple devices to perform a ranging procedure with a second device, the set of multiple devices including the second device and one or more third devices that include the third device, receive signaling from the second device as part of the ranging procedure, where a location metric associated with the second device is determined based on the received signaling, and transmit, to the first device and based on performing the ranging procedure, an indication of the location metric associated with the second device.

Another apparatus for wireless communication at a third device is described. The apparatus may include means for receiving, from a first device, an indication for a set of multiple devices to perform a ranging procedure with a second device, the set of multiple devices including the second device and one or more third devices that include the third device, means for receiving signaling from the second device as part of the ranging procedure, where a location metric associated with the second device is determined based on the received signaling, and means for transmitting, to the first device and based on performing the ranging procedure, an indication of the location metric associated with the second device.

A non-transitory computer-readable medium storing code for wireless communication at a third device is described. The code may include instructions executable by a processor to receive, from a first device, an indication for a set of multiple devices to perform a ranging procedure with a second device, the set of multiple devices including the second device and one or more third devices that include the third device, receive signaling from the second device as part of the ranging procedure, where a location metric associated with the second device is determined based on the received signaling, and transmit, to the first device and based on performing the ranging procedure, an indication of the location metric associated with the second device.

Some examples of the method, apparatuses, and non-transitory computer-readable medium described herein may further include operations, features, means, or instructions for receiving, from a network device, an indication of an expected location metric associated with the second device and an error tolerance for the expected location metric associated with the second device, where transmitting the indication of the location metric associated with the second device may be based on the error tolerance for the expected location metric associated with the second device.

In some examples of the method, apparatuses, and non-transitory computer-readable medium described herein, transmitting the indication of the location metric associated with the second device may include operations, features, means, or instructions for transmitting an indication of whether the location metric associated with the second device may be within the error tolerance of the expected location metric associated with the second device.

In some examples of the method, apparatuses, and non-transitory computer-readable medium described herein, transmitting the indication of the location metric associated with the second device may include operations, features, means, or instructions for transmitting, to the first device, an indication of a distance between the first device and the second device.

DETAILED DESCRIPTION

Figure 1:
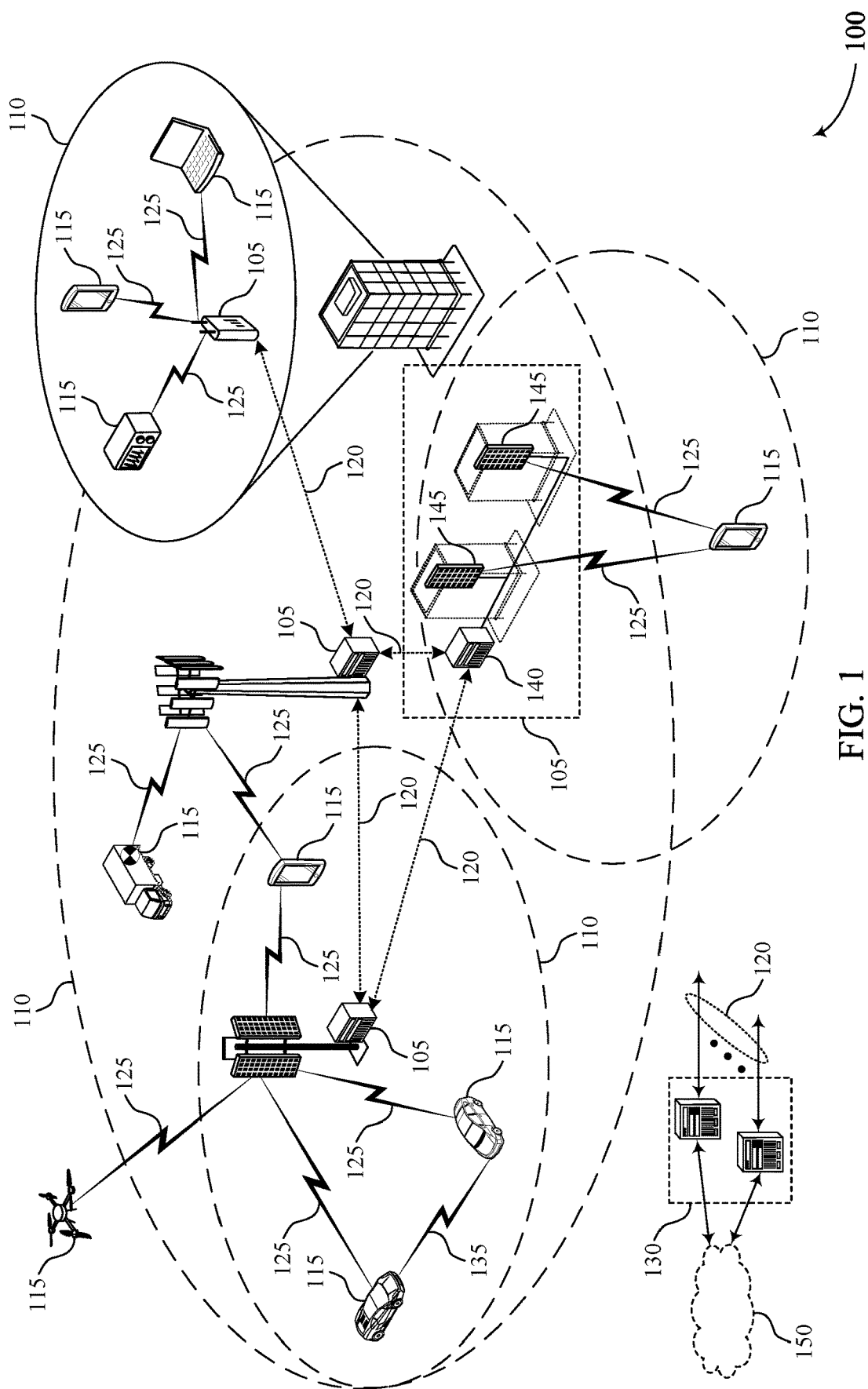
FIG. 1 illustrates an example of a wireless communications system that supports security techniques for ranging in wireless networks in accordance with aspects of the present disclosure.

Security techniques may be implemented to secure a communication within a wireless communications system. For example, a first device (e.g., a first user equipment (UE)) may transmit information to a second device (e.g., a second UE) and the second device may determine whether to trust that information (e.g., determine if the information is valid). Security may be enabled at different levels or layers of a protocol stack of a device, and some security methods may omit lower layer security (e.g., physical layer security). However, there may be some applications where lower layer security may support increased security for communications, such as when a time of arrival of a transmission may be used by a UE. For example, in an application such as a digital key, a vehicle UE may unlock by estimating (e.g., inferring) whether a mobile UE is within a defined or configured range of the vehicle UE, which may be referred to as positioning or ranging. While examples herein describe security for transmissions between UEs, it is to be understood that these examples may apply to any device participating in wireless communications.

When performing sidelink based positioning (e.g., a ranging procedure), two UEs (e.g., two or more UEs) may communicate positioning reference signals (PRS) to obtain a position or range between the UEs, for example, in response to a request or indication from an initiating UE. One or more eavesdroppers or attackers (e.g., an eavesdropper or attacker device) may attempt to spoof or imitate the PRS. For example, an eavesdropper may observe the PRS communicated by the UEs and may send a spoofed or fake PRS signal on top of the actual PRS, which spoofed signal may arrive slightly sooner at a receiving UE (e.g., may be a time-advanced PRS). The receiving UE (e.g., the initiating UE) may receive the superposition of the original PRS signal and the time-advanced PRS from the eavesdropper. Based on the time-advanced PRS, the receiving UE may estimate that a range between the receiving UE and a transmitting UE (e.g., a target UE for the ranging procedure) is smaller than an actual range between the receiving UE and the transmitting UE.

In order to increase security for physical layer communications, UEs may perform cooperative secure ranging to avoid spoofing by an eavesdropper. For example, one or more UEs may cooperate with the receiving UE to determine whether a link has been eavesdropped. At least one or more other UEs may receive legitimate PRS from the transmitting UE, with a correct timing. The one or more other UEs (e.g., cooperating UEs) may cooperate with the receiving UE, for example, by communicating a location metric (e.g., an angle of arrival, angle of departure, estimated location, estimated distance, or variation from an indicated location) associated with the transmitting UE.

If the location metrics transmitted by the cooperating UEs agree with a location metric estimated by the receiving UE (e.g., are within a similar error range, are indicative of a same or similar location), the receiving UE may determine that there has not been an attack by an eavesdropper. If the location metrics transmitted by the cooperative UEs do not agree (e.g., are not within a similar error range, are not indicative of a same or similar location) the receiving UE may determine that there may be an eavesdropper attack. If the receiving UE determines that an eavesdropper attach has occurred, the receiving UE may adjust or alter one or more communication parameters for the communication link with the transmitting UE (e.g., the target UE).

Aspects of the disclosure are initially described in the context of wireless communications systems. Aspects of the disclosure are further illustrated by and described with reference to a process flow, apparatus diagrams, system diagrams, and flowcharts that relate to security techniques for ranging in wireless networks.

FIG. 1 illustrates an example of a wireless communications system 100 that supports security techniques for ranging in wireless networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In order to increase security for physical layer communications, UEs 115 may perform cooperative secure ranging to avoid spoofing by an eavesdropper. For example, one or more UEs 115 may cooperate with an initiating UE 115 that initiates a ranging procedure with a target UE 115, to determine whether a link has been eavesdropped. The one or more cooperating UEs 115 and the initiating UE 115 may receive PRS from the target UE as part of the ranging procedure, and may each determine a respective location metric associated with the target UE 115 based on the received PRS. The one or more cooperating UEs 115 may each communicate, to the initiating UE 115, the respective location metric (e.g., an estimated location, estimated distance, or variation from an indicated location) associated with the transmitting UE 115. Based on the communicated location metric(s), the initiating UE 115 may determine whether an eavesdropper is present and may communicate with the target UE 115 based on the determination (e.g., may adjust or alter a communication link if an eavesdropper is determined to be present).

Figure 2:
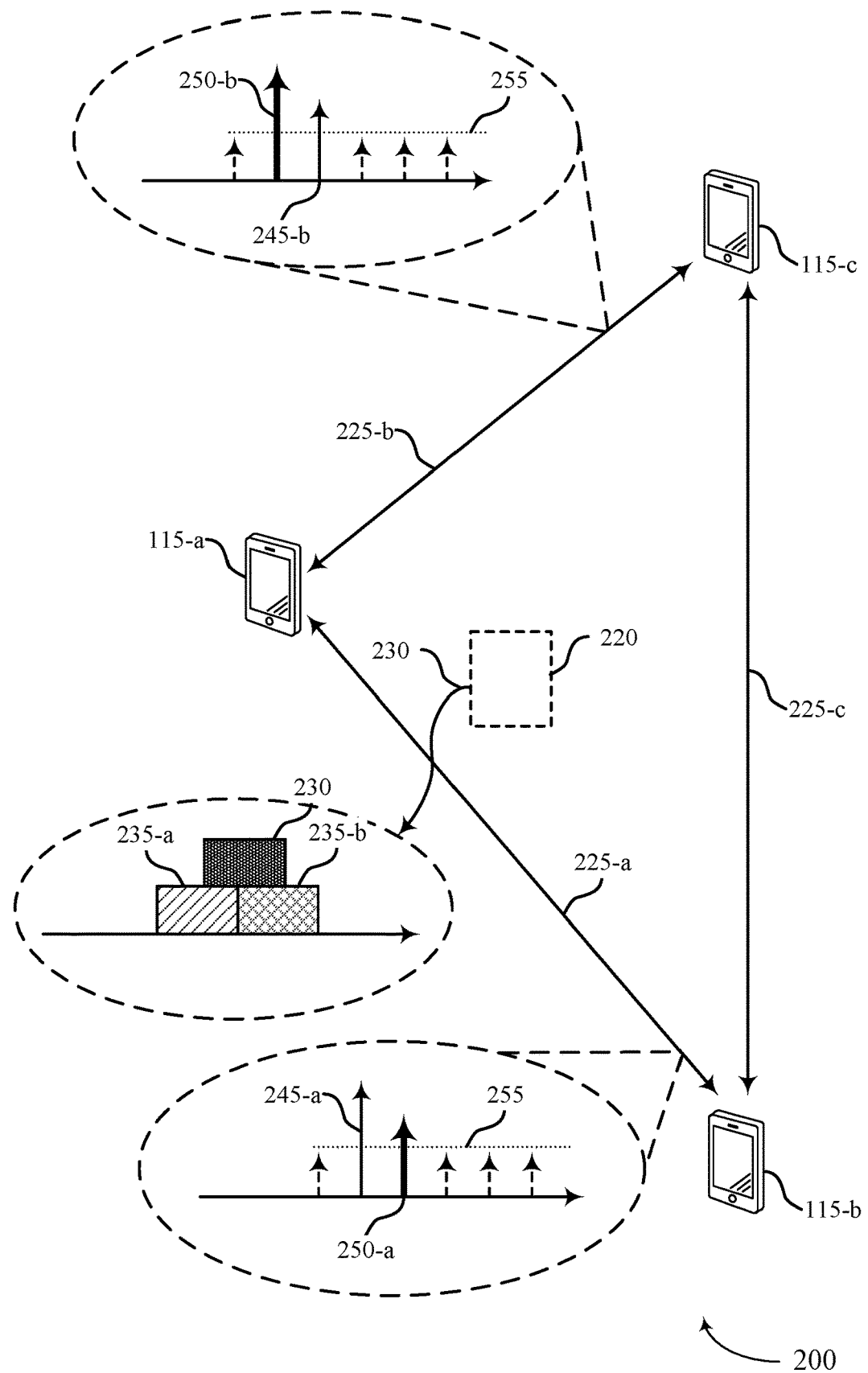
FIG. 2 illustrates an example of a wireless communications system that supports security techniques for ranging in wireless networks in accordance with aspects of the present disclosure.

FIG. 2 illustrates an example of a wireless communications system 200 that supports security techniques for ranging in wireless networks in accordance with aspects of the present disclosure. In some examples, wireless communications system 200 may implement aspects of wireless communications system 100. The wireless communications system 200 includes UEs 115-a, 115-b, and 115-c, which may be examples of the UEs 115 as described with reference to FIG. 1.

Security techniques may be implemented to secure a communication (e.g., a 5G or sixth generation (6G) communication) within wireless communications system 200 (e.g., based on an application for the communication). For example, if UE 115-a shares (e.g., transmits) information with UE 115-b, UE 115-a may determine whether to trust that information (e.g., determine if the information is accurate or legitimate), for example, based on one or more guidelines. Security may be enabled at different levels or layers of a protocol stack (e.g., physical layer, MAC layer, application layer), and some security methods may include upper layer security (e.g., application level security) rather than lower layer security (e.g., physical layer security). However, there may be some applications where lower layer security may support increased security for communications, such as when a time of arrival of a transmission (e.g., a first path or first transmission path) may be used by a UE 115. For example, in an application such as a digital key, UE 115-b may be an example of a vehicle UE 115 which unlocks by estimating (e.g., inferring) whether UE 115-a (e.g., a pedestrian mobile UE 115, or UE 115 of a driver of the vehicle) is within a defined or configured range.

Some physical layer security mechanisms in uplink and downlink may include securing a control channel with a cell radio network temporary identifier (C-RNTI) of a UE, securing a paging channel with a paging radio network temporary identifier (P-RNTI), securing a random access channel with a random access radio network temporary identifier (RA-RNTI), or any combination thereof. However, when estimating the range to UE 115-*a*, UE 115-*b* may determine the position of UE 115-*a* using techniques such as ranging or sidelink positioning, which may not be associated with such physical layer security features.

For example, sidelink based positioning may include performance of a ranging exercise based on a PRS round trip time (RTT) measurement between UEs 115 of the wireless communications system 200, where there may be any number N of participating UEs 115. Sidelink based positioning may be used for radio access network (RAN) specific operation (e.g., within a RAN, such as a 5G RAN) or independent of a RAN (e.g., outside of or without the control of a RAN). When performing sidelink based positioning (e.g., a ranging procedure), two UEs 115 (e.g., two or more UEs 115) may communicate PRS to obtain a position or range between the UEs 115. For example, UEs 115 may broadcast capability information (e.g., PRS bandwidth capability, an identifier (ID), unlicensed band usage capability), and an initiating UE 115 (e.g., a UE 115 initiating the ranging procedure) may send a PRS request that identifies a target UE 115 for the ranging or positioning procedure. The PRS request may be broadcast, groupcast, or unicast (e.g., based on which UEs 115 participate in the ranging procedure), may indicate a reference signal ID for the PRS for the ranging procedure, may indicate a channel for the PRS, and may indicate a timing for the PRS (e.g., among other information).

The UEs 115 participating in the ranging procedure may send a PRS response (e.g., indicating the reference signal ID, and feedback for the PRS request), where the PRS response may be broadcast, groupcast, or unicast. In some cases, the initiating UE 115 may transmit a PRS confirmation (e.g., indicating a modification or confirmation of the ranging procedure or ranging session), where the PRS confirmation may be broadcast, groupcast, or unicast. The target UE 115 may transmit, to all participating UEs 115 (e.g., all UEs 115 performing the ranging procedure), the indicated PRS (e.g., on an unlicensed spectrum band). The PRS transmission may be followed by a post PRS transmission from the participating UEs 115, which may include PRS measurement information, a respective UE location, a motion state of the UE 115 at PRS transmission time, or any combination thereof, which may be used by the other participating UEs 115 for range or location calculations. For example, each UE 115 may report an RTT measured from the target UE 115 (e.g., UE 115-*a*) to all other participating UEs 115, along with a respective UE location (e.g., if known). For a UE 115 with zero or inaccurate knowledge of its position, the ranging procedure may yield an estimation of a range between UEs 115 (e.g., as opposed to a UE location). For a UE 115 with accurate knowledge of its position, the range may further yield an estimate absolute position. When performing the ranging procedure, any UE 115 may be an initiator, and in some cases, UEs 115 may participate in multiple ranging sessions concurrently.

In one example, in order for UE 115-*b* to determine the range between itself and UE 115-*a*, UE 115-*b* may transmit a request for PRS from UE 115-*a* and UE 115-*a* may send PRS over communication link 225-*a* to UE 115-*b*. The PRS may be transmitted via a signal 235, which may be represented as two portions of signal, or signals 235-*a* and 235-*b*. However, one or more eavesdroppers 220 may attempt to spoof PRS (e.g., a security attack) sent by the UEs 115 (e.g., by UE 115-*a*). In some cases, the eavesdropper 220 may observe the PRS (e.g., the signal 235) sent by UE 115-*a* and may send a PRS 230 on top of the actual PRS that may arrive slightly sooner at UE 115-*b* (e.g., a time-advanced PRS 230). UE 115-*b* may receive the superposition of the original signal 235 sent by UE 115-*a* and the time-advanced PRS 230 (e.g., another signal) from the eavesdropper 220. Based on the time-advanced PRS 230, a channel estimate performed by UE 115-*b* may include a first signal 245-*a* (e.g., a first path) sent by the eavesdropper 220 that arrives at UE 115-*b* sooner than a real first signal 250-*a* (e.g., real first path) sent by UE 115-*a*, both of which may be above an interference level 255 for the channel estimate. Based on the time-advanced first signal 245-*a*, UE 115-*b* may estimate that UE 115-*a* is closer to UE 115-*b* than an actual distance between UE 115-*a* and UE 115-*b*.

In order to increase security for physical layer communications, UEs 115 may perform cooperative secure ranging to avoid spoofing by an eavesdropper 220. In some cases, one or more UEs 115 may cooperate with UE 115-*b* to determine whether a link has been eavesdropped, for example, because it may be unlikely that the eavesdropper 220 is able to spoof the PRS of all the communication links 225 simultaneously. For example, at least one or more other UEs 115, such as UE 115-*c*, may receive legitimate PRS from UE 115-*a*, with the correct time advance. In one example, while the PRS sent from UE 115-*a* to UE 115-*b* may be spoofed by eavesdropper 220, the PRS sent by UE 115-*a* to UE 115-*c* (e.g., on communication link 225-*b*) may not be spoofed and an actual first signal 250-*b* (e.g., a first arrival) may be accurately received by UE 115-*c* (e.g., in spite of receiving a later, first signal 245-*b* from the eavesdropper 220). UE 115-*c* may cooperate with UE 115-*b*, for example, by communicating via communication link 225-*c*, such that UEs 115-*c* and 115-*b* may determine that there may be an eavesdropper 220 attempting to spoof the location of UE 115-*a*.

For example, cooperating UEs 115-*b* and 115-*c* may exchange a location metric (e.g., an angle of arrival, angle of departure, estimated location, estimated distance, or variation from an indicated location) for the target UE 115-*a*, such as over communication link 225-*c*. In one example, UE 115-*c* may transmit an indication of a determined location metric to UE 115-*b* (e.g., because UE 115-*b* initiated the ranging procedure). If the location metrics exchanged by the cooperating UEs 115 agree (e.g., are within an indicated error range, are indicative of a same or similar location for UE 115-*a*), UE 115-*b* may determine that there has not been an attack by an eavesdropper 220. If the location metrics exchanged by participating UEs 115 do not agree (e.g., are not within the indicated error range, or if the determined locations of UE 115-*a* are not the same or within a range of each other) UE 115-*b* may determine that there may be an eavesdropper 220 in the wireless communications system 200. In some cases, randomizing the UEs 115 with which cooperative secure ranging is performed (e.g., randomizing the geographical locations of the cooperating UEs 115) may further decrease the ability of the eavesdropper 220 to spoof PRS simultaneously for the different geographical locations of the UEs 115.

These security measures (e.g., secure ranging) may increase security for wireless communications system 200, for example, by supporting accurate estimation of a distance or range between devices. In some examples, the secure ranging techniques described herein may increase security (e.g., and increase safety) in cases where global navigation satellite systems (GNSS) or network-based positioning services are not available.

Figure 3:
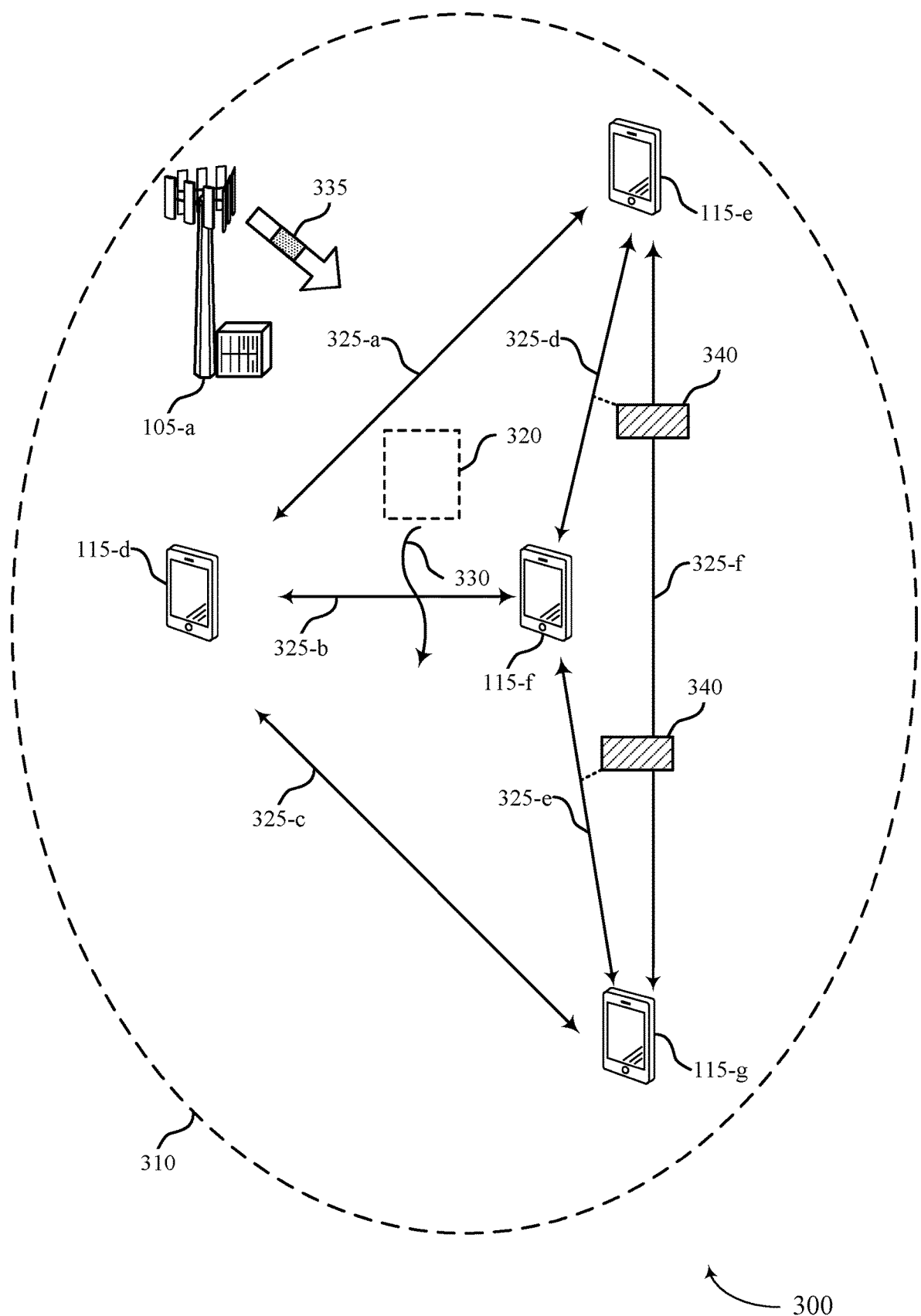
FIG. 3 illustrates an example of a wireless communications system that supports security techniques for ranging in wireless networks in accordance with aspects of the present disclosure.

FIG. 3 illustrates an example of a wireless communications system 300 that supports security techniques for ranging in wireless networks in accordance with aspects of the present disclosure. In some examples, wireless communications system 300 may implement aspects of wireless communications system 100 or 200. For example, the wireless communications system 300 may include base station 105-a and UEs 115-d, 115-e, 115-f, and 115-g, which may be examples of a base station 105 and UEs 115 as described with reference to FIGS. 1 and 2.

As described with reference to FIG. 2, in order to perform cooperative secure ranging, UEs 115 may exchange error information to support a consensus for determining an existence of an eavesdropped link. For example, a roadside unit (RSU) or a base station 105 (e.g., base station 105-a) may transmit, to each cooperating UE 115, an indication of an initial location (e.g., a rough or estimated location) of each other cooperating UE 115 within a coverage area 310 (e.g., UEs 115-d, 115-e, 115-f, and 115-g). For example, base station 105-a may include the initial locations in an indication 235, which may be transmitted to each UE 115 in the coverage area 310. In some cases, the cooperating UEs 115 may have previously performed a ranging session with base station 105-a (e.g., or with the RSU), such that base station 105-a (e.g., or the RSU) may have access to an initial location of the cooperating UEs 115. In other cases, base station 105-a (e.g., or the RSU) may obtain the initial locations of the cooperating UEs 115 through a global positioning system (GPS) measurement.

Along with the initial locations, base station 105-a (e.g., or the RSU) may provide (e.g., in the indication 235) a respective, expected error tolerance for the location of each of the UEs 115 (e.g., an error tolerance for UE ranging measurements). The error tolerances may be provided by base station 105-a (e.g., or the RSU) based on a history of prior ranging measurements performed, based on geographical locations of the cooperating UEs 115, or based on a capability of the cooperating UEs 115, among other examples. In some cases, base station 105-a (e.g., or the RSU) may provide a respective upper and lower error range or tolerance for each UE's location. For example, base station 105-a may respectively provide a lower end of an error range, $a_i$, and an upper end of an error range, $b_i$, for a location of each cooperative UE 115 (e.g., for each $UE_i$, where i=1, 2, 3, ..., n).

In some other cases, base station 105-a (e.g., or the RSU) may provide the error distribution characterized by a mean and a covariance (e.g., or other statistical parameter) for each UE's location. For example, base station 105-a may respective provide a mean, $\mu_i$, and a covariance, $\Sigma_i$, for a location of each cooperative UE 115 (e.g., for each $UE_i$, where i=1, 2, 3, ..., n).

In one example, UEs 115-e, 115-f, and 115-g may be stationary or vehicle UEs 115, while UE 115-d may be a mobile UE 115. UE 115-f may determine to perform range measurements with UE 115-d to determine an inter-UE distance between UE 115-f and UE 115-d at a current time. Accordingly, UE 115-f may transmit, to UEs 115-d, 115-e, and 115-g, an indication for UEs 115-f, 115-e, and 115-g to perform a secure ranging procedure with UE 115-d. Based on the indication to perform the ranging procedure, UE 115-d may transmit PRS to each of the cooperating UEs (e.g., UEs 115-f, 115-e, and 115-g). Each of the cooperating UEs 115-e, 115-f, and 115-g may respectively determine a location of UE 115-d and/or a respective range to UE 115-d (e.g., using singled sided RTT measurement).

If the cooperating UEs 115 are configured with an error tolerance threshold, each of the cooperating UEs 115 may determine whether a ranging or location error (e.g., obtained from prior known approximate locations, such as obtained via another ranging procedure) falls within the error tolerance threshold (e.g., [$a_i$, $b_i$]) configured by base station 105-a (e.g., or the RSU). If the cooperating UEs 115 are configured with an error distribution, each of the cooperating UEs 115 may determine whether the ranging or location error falls within a statistical range (e.g., one or two sigma) of the error distribution (e.g., [$\mu_i$, $\Sigma_i$] configured by base station 105-a (e.g., or the RSU). Additionally or alternatively, if the cooperating UEs 115 are configured with an error distribution, each of the cooperating UEs 115 may determine an estimation error for the respective estimated range or location of UE 115-d and may compare the estimation error to the configured error distribution.

Based on the determinations associated with the error, the cooperating UEs 115 may determine whether there is an eavesdropper 320 attempting to spoof the location of UE 115-d. For example, if the eavesdropper 320 attempts to spoof the location of UE 115-d on communication link 325-b (e.g., via signaling 330), UE 115-f may have a different error result than UEs 115-e and 115-g, in which case the cooperating UEs 115 may determine that the eavesdropper 320 is attempting to spoof the location of UE 115-d.

For example, cooperating UEs 115 may perform a cooperative message exchange, in which each of the cooperating UEs 115 may exchange information (e.g., a one-bit information) to indicate to the other cooperating UEs 115 whether or not the respective measured error tolerance falls within the configured threshold. In some cases, the cooperating UEs 115 may exchange one bit of information indicating whether the respective error tolerance falls within the threshold, while in other cases, the cooperating UEs 115 may exchange absolute or quantized errors averaged over one or more ranging measurements. The cooperating UEs 115 may each, for example, transmit a respective indication 340 to UE 115-f (e.g., and in some cases to the other cooperating UE(s) 115), which may include an indication of a location metric such as an indication of the determined error.

UE 115-f may receive the error information from the other cooperating UEs 115 (e.g., UEs 115-e and 115-g) and may determine whether an eavesdropper 320 is present based on the exchanged error information, as well as the error information determined by UE 115-f. For example, if an error tolerance observed by UE 115-f (e.g., an error tolerance [$a_4'$, $b_4'$]) lies within the configured error tolerance (e.g., the error tolerance threshold configured by the base station 105-a or the RSU, such as [$a_4$, $b_4$]), UE 115-f may determine that its current ranging measurement is not being spoofed by an eavesdropper 320.

In another example, if the error tolerance observed by UE 115-f (e.g., error tolerance [$a_4'$, $b_4'$]) lies outside the configured tolerance (e.g., threshold [$a_4$, $b_4$]), and if both UEs 115-e and 115-g report their observed tolerances are within the configured tolerance threshold, UE 115-f may determine that there may be an eavesdropper 320 on communication link 325-b (e.g., based on the observation of a different error result at UE 115-f compared to UEs 115-e and 115-g). However, if the error tolerance observed by UE 115-f lies outside the configured tolerance threshold, and if both UEs 115-e and 115-g report their observed tolerances are outside the configured tolerance threshold, UE 115-*f* may determine that communication link 325-*b* is unlikely to have been eavesdropped or spoofed (e.g., because it may be unlikely that all links are simultaneously eavesdropped). In such cases, UE 115-*d* may be mobile or the different communication links 325 may be experiencing other environmental factors common to all UEs 115.

In some cases, the determination of whether communication link 325-*b* is spoofed by an eavesdropper 320 may be based on one or more parameters (e.g., parameters configured by base station 105-*a* or the RSU). For example, UE 115-*f* may determine the presence of an eavesdropper 320 if a first threshold percentage or quantity (e.g., x %) of the cooperating UEs 115 other than UE 115-*f* (e.g., UE 115-*e* and UE 115-*g*) report differently from the range measurement and error determination of UE 115-*f*. For example, if a percentage or quantity of the other cooperating UEs 115 reporting that the respective error tolerance is within the configured range corresponding to that UE 115 fails to satisfy a threshold, and if UE 115-*f* determines that the error tolerance is outside of the configured range, UE 115-*f* may determine or infer the presence of an eavesdropper 320. Similarly, UE 115-*f* may determine that the presence of an eavesdropper 320 is unlikely if the percentage or the quantity of the other cooperating UEs 115 reporting a same error tolerance result as UE 115-*f* (e.g., report an error tolerance outside the respective, configured range) satisfies a the threshold (or a second, different threshold). In such cases, UE 115-*f* may determine that UE 115-*d* is experiencing environmental factors common to all UEs 115 (e.g., UE 115-*d* is mobile), and that therefore the presence of an eavesdropper 320 is unlikely (e.g., based on a difficulty to eavesdrop all communication links 325 simultaneously).

While the examples described herein are associated with a distance (e.g., range) or location estimation (e.g., based on a RTT measurement), and associated error tolerance threshold, the same examples may also apply to one or more other parameters, such as an angle of arrival or an angle of departure of the PRS (e.g., among other parameters). For example, base station 105-*a* or the RSU may provide an indication of an initial angle of arrival or angle of departure to the UEs 115, along with an error range or distribution for the angle of arrival or angle of departure. Based on the indicated angle of arrival or angle of departure, and associated error range or distribution, the cooperating UEs 115 may cross-check a measured angle of arrival or angle of departure of the PRS transmitted by UE 115-*d* (e.g., may determine whether the angle of arrival or angle of departure fall within the error range or distribution) and may transmit, to UE 115-*f*, an indication of a result of the cross-checking. Based on the indications of the results of the cross-checking, UE 115-*f* may determine whether an angle of arrival or departure measured from UE 115-*d* is valid, and whether an eavesdropper 320 is present.

In some cases, UE 115-*f* may take action based on determining that there is a possible attack by an eavesdropper 320 (e.g., based on determining that a location metric for UE 115-*d* is invalid). For example, UE 115-*f* may choose cooperating UEs 115 (e.g., UEs 115-*e* and 115-*g*, among other UEs 115) that are geographically separate (e.g., in different geographic zones) to perform a ranging session (e.g., to perform a second or new ranging procedure). In some cases, cooperating UEs 115 may be chosen such that each cooperating UE 115 belongs to a different zone, to increase a likelihood that an eavesdropper 320 will be unable to attack all communication links 325 simultaneously (e.g., be unable to attack in every zone). In some examples, UE 115-*f* may choose the cooperating UEs 115 randomly, based on a shared key (e.g., based on a key shared by the cooperating UEs 115, or associated with the cooperating UEs 115).

In some cases, upon inference that an eavesdropper 320 is attacking communication link 325-*b*, UE 115-*f* may abandon the current eavesdropped session and drop communication link 325-*b* (e.g., among other communication links 325, such as communication links 325-*d* and 325-*e*). After dropping the one or more communication links 325, UE 115-*f* and all other cooperating UEs 115 (e.g., UEs 115-*d*, 115-*e*, and 115-*g*) may enter into a different (e.g., second) ranging session at a time slot or frame that is offset from the current abandoned session (e.g., offset from dropping the one or more communication links 325), based on a shared key of UE 115-*f* or UE 115-*d*. For example, each UE 115 may be assigned a unique key by base station 105-*a* or the RSU, where each of the keys may be known to each of the other UEs 115. The second ranging session may also use a common PRS sequence for range measurement. In some examples, after UE 115-*f* infers a possible attack, the UEs 115 may use a PRS sequence for a second ranging procedure, where the PRS sequence may be dependent on a shared key (e.g., a key shared by the UEs 115) to perform ranging measurements. In such cases, each UE 115 may be assigned a unique key by base station 105-*a* or the RSU, and each of the keys may be known to each of the other UEs 115.

In some cases, based on performing the ranging procedure (e.g., using a range of angle of arrival measurement), cooperating UEs 115-*e* and 115-*g* may each estimate a respective range between UE 115-*f* and UE 115-*d*, and may provide the estimated ranges to UE 115-*f* (e.g., via respective indications 340). UEs 115-*e*, 115-*f*, and 115-*g* may each be aware of each other's location from a prior ranging measurement or prior GPS measurement. Based on known locations and performing the ranging procedure with UE 115-*d*, the cooperating UEs 115-*e* and 115-*g* may independently provide, to UE 115-*f*, an estimate of an expected range between UE 115-*d* and UE 115-*f*. In some cases, UE 115-*f* may determine whether its estimated range to UE 115-*d* is accurate, or valid, based on the indicated expected ranges. In some cases, UE 115-*f* may obtain a final estimate of a range to UE 115-*d* by taking a mean of the range estimated by UE 115-*f* and the range estimates obtained from UEs 115-*e* and 115-*g* (e.g., by combining the range estimates of UEs 115-*e*, 115-*f*, and 115-*g*). UE 115-*f* may, for example, use this mean range estimate to minimize an effect of eavesdropper 320 on determining whether to perform its digital car key management (e.g., unlock vehicle UE 115-*f*).

In some cases (e.g., in addition or as an alternative to exchanging ranging information), the UEs 115 participating in the ranging procedure may communicate short PRS (e.g., shortened PRS) to reduce or mitigate the effects of eavesdropper 320. For example, the attacker or eavesdropper 320 may use a period of time to detect a PRS signature and transmit the spoofed PRS. If the PRS transmission or signal is too short to allow time for spoofing the PRS, the PRS transmission may be more challenging to spoof. One or more of the UEs 115 may request short PRS for additional security (e.g., may transmit a request to the other UEs 115 to use the short PRS, or shortened PRS, for the ranging procedure or for another ranging procedure).

In some cases, the short PRS transmission may be repeated periodically, and may potentially be spoofed at a next transmission occasion. To prevent this, a key for generating the short PRS may be pseudo-randomized across the PRS transmission occasions (e.g., a c_init for PRS sequence generation may be pseudo-randomized). The pseudo-randomization (e.g., key-hopping) of the key may be generated by a function which may be associated with another key that is shared by the UEs 115 performing the ranging procedure. In some cases, inter-slot PRS repetition may be configured (e.g., PRS may repeat at a single transmission occasion), and in the case of periodic PRS, a whole set of PRS may be repeated on each transmission occasion based on a periodicity of the PRS. In some cases, in addition or as an alternative to requesting the short PRS, a UE 115 may request a low or lowered repetition count (e.g., may request no repetition), or may request key-randomization to be added across the repetitions.

Figure 4:
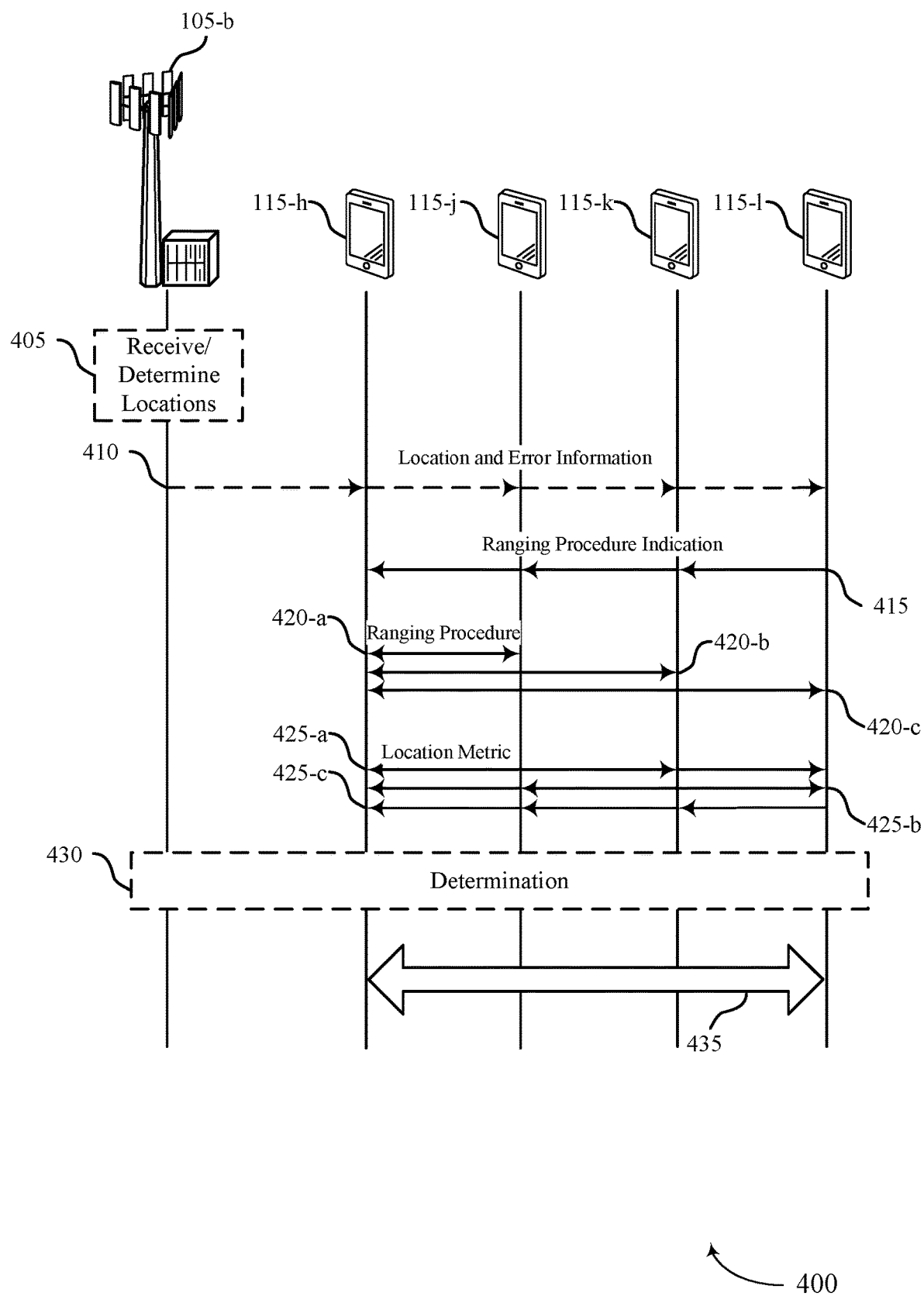
FIG. 4 illustrates an example of a process flow that supports security techniques for ranging in wireless networks in accordance with aspects of the present disclosure.

FIG. 4 illustrates an example of a process flow 400 that supports security techniques for ranging in wireless networks in accordance with aspects of the present disclosure. In some examples, process flow 400 may implement or be implemented by one or more aspects of wireless communications system 100, 200, or 300. Process flow 400 may be implemented by UEs 115-*h*, 115-*j*, 115-*k*, and 115-*l* and a base station 105-*b*, which may be examples of a UE 115 and a base station 105 described with reference to FIGS. 1-3. In some cases, base station 105-*b* may additionally or alternatively represent an RSU.

In the following description of the process flow 400, the operations between UEs 115-*h*, 115-*j*, 115-*k*, and 115-*l* and base station 105-*b* may be transmitted or performed in a different order than the order shown. Certain operations may also be left out of the process flow 400, or other operations may be added to the process flow 400. It is to be understood that while base station 105-*b* and UEs 115-*h*, 115-*j*, 115-*k*, and 115-*l* are shown performing a number of the operations of process flow 400, any wireless device may perform the operations shown. For example, while four UEs 115 are shown performing the operations of process flow 400, it is to be understood that any three or more UEs 115 may perform the same operations. 115 *h*, 115 *j*, 115 *k*, and 115 *l*

At 405, in some cases, base station 105-*b* may determine and/or receive locations of UEs 115-*h*, 115-*j*, 115-*k*, and 115-*l*. In some cases, base station 105-*b* may determine the respective locations of the UEs 115 from a previously performed ranging session between each UE 115 and base station 105-*b*. In other cases, base station 105-*b* may determine the respective UE locations via GPS measurements.

At 410, in some cases, base station 105-*b* may transmit, to each UE 115, initial location information or an expected location metric of each UE 115, along with a respective error tolerance threshold for each location. For example, UE 115-*j* may receive the locations of UE 115-*h*, UE 115-*k*, and UE 115-*l* and an error tolerance for each, and UEs 115-*h*, 115-*k*, and 115-*l* may receive similar information regarding the other UEs 115.

At 415, UE 115-*l* (e.g., an initiating UE 115) may transmit, to UE 115-*h* (e.g., a target UE 115) and to UEs 115-*j* and 115-*k* (e.g., cooperating UEs 115) an indication to perform a cooperative secure ranging procedure. For example, UE 115-*l* may transmit, to UEs 115-*h*, 115-*j*, and 115-*k*, an indication to perform a ranging procedure with UE 115-*h*. In some cases, UE 115-*l* may be an example of a vehicle UE 115 and UE 115-*h* may be an example of a digital key, where UE 115-*l* may unlock based on the location of UE 115-*h*. In this example, the UEs 115 may employ one or more of the security measures described herein to determine whether the location of UE 115-*h* is accurate and not spoofed by an eavesdropper.

At 420, UE 115-*h* may transmit PRS to UEs 115-*j*, 115-*k*, and 115-*l* as part of the ranging procedure (e.g., UEs 115-*j*, 115-*k*, and 115-*l* may receive signaling from UE 115-*h* as part of the ranging procedure). For example, UE 115-*h* may transmit PRS to UE 115-*j* at 420-*a*, to UE 115-*k* at 420-*b*, and to UE 115-*l* at 420-*c*. In some cases, the UEs 115 may exchange other information as part of the ranging procedure as described herein with reference to FIG. 2 (e.g., to support determination of a range between the UEs 115 or the location of each UE 115). Based on the received PRS (e.g., and other ranging signaling), each UE 115 may determine a location of UE 115-*h*, or a respective range to UE 115-*h* (e.g., a location metric). The estimated location or range may be compared to the expected location, which may be based on the location information sent by base station 105-*b* at 410. Each cooperating UE 115 (e.g., UEs 115-*j*, 115-*k*, and 115-*l*) may determine if the respective estimated location of UE 115-*h* is within the indicated error tolerance for that UE 115.

At 425, UEs 115-*j*, 115-*k*, and 115-*l* may transmit, to each other UE 115, a respective indication of a location metric determined by that UE 115 (e.g., where the location metric may be relative from UE 115-*h* to the respective UE 115). For example, UE 115-*h* may transmit the indication of the location metric at 425-*a*, UE 115-*k* may transmit a similar indication at 425-*b*, and UE 115-*l* may transmit a similar indication at 425-*c*. In some cases, each cooperative UE 115 may transmit an indication of whether that UE 115 has determined the location or range of UE 115-*h* to be within the corresponding error tolerance, as described with reference to FIG. 3. In such cases, the non-initiating cooperating UEs (e.g., UEs 115-*j* and 115-*k*) may transmit, to the initiating UE 115-*l*, an indication of whether the respective determined location of UE 115-*h* is within the respective indicated error tolerance, or a calculated error tolerance. In some cases, each cooperating UE 115 may also transmit a respective indication of an estimated distance between the initiating UE 115-*l* and the target UE 115-*h*, as described with reference to FIG. 3.

At 430, in some cases, UE 115-*l* (e.g., the initiating UE 115) may determine, based on the information (e.g., location metric information) received from the cooperating UEs 115-*j* and 115-*k* at 425, whether an estimated location or range (e.g., estimated location metric) for UE 115-*h* is valid (e.g., as described with reference to FIG. 3). For example, UE 115-*l* may determine whether UE 115-*h* is at an estimated or indicated location, is at a new location (e.g., is moving or experience other environmental factors), or if the communication link with UE 115-*h* has been spoofed by an eavesdropper. If UE 115-*l* determines that the estimated location (e.g., estimated location metric) is within the indicated error tolerance of the expected location, UE 115-*l* may determine that the estimated location of UE 115-*h* is valid. In another example, UE 115-*l* may determine that the estimated location of UE 115-*h* is valid (e.g., but at a new location or experiencing another factor) based on determining that the estimated location is outside of the indicated error tolerance, and based on receiving a same indication from UEs 115-*j* and 115-*k* (e.g., an indication that the estimated location is outside of the indicated error tolerance).

In another example, UE 115-*l* may determine that the estimated location of UE 115-*h* is invalid based on determining that the estimated location is outside of the indicated error tolerance, and based on receiving a different indication from UEs 115-*j* and 115-*k* (e.g., an indication that the estimated location is within the indicated error tolerance). In other words, if the cooperating UEs 115 (e.g., UEs 115-*j* and 115-*k*) do not confirm what is determined by UE 115-*l* (e.g., the initiating UE 115), UE 115-*l* may determine that there may be an eavesdropper attempting to spoof the connection with UE 115-*h*.

In some cases, UE 115-*l* may determine whether the location metric of UE 115-*h* is valid or invalid based on a percentage or quantity of cooperating UEs 115 that indicate a same indication metric, or a different location metric, compared to the location metric estimated by UE 115-*l*. In some cases, after determining that there may be an eavesdropper in the system, UE 115-*l* may take one or more actions to address the eavesdropping, as described with reference to FIG. 3. For example, UE 115-*l* may include UEs 115 at various locations to increase a difficulty for an eavesdropper to spoof the location of UE 115-*h*. In other cases, UEs 115 may be added to the cooperative secure ranging procedure that may be based on a shared key. In some cases, after determining that the location metric of UE 115-*h* may have been spoofed, UE 115-*l* may drop the communication link with UE 115-*h* and perform a second ranging procedure at a time offset from dropping the link, where the second ranging procedure may be based on a shared key between the cooperating UEs 115.

At 435, UE 115-*l* and UE 115-*h* may communicate based on the indications of the location metric. For example, as described herein, UE 115-*l* may determine that the estimated location metric of UE 115-*h* is valid and may continue to communicate with UE 115-*h*. In some cases, if UE 115-*l* determines that the estimated location metric of UE 115-*h* is invalid, UE 115-*l* may take one or more actions to alter or adjust the communications with UE 115-*h*. Based on performing the cooperative secure ranging procedure, the communications between UE 115-*l* and 115-*h* may experience an increase in security.

Figure 5:
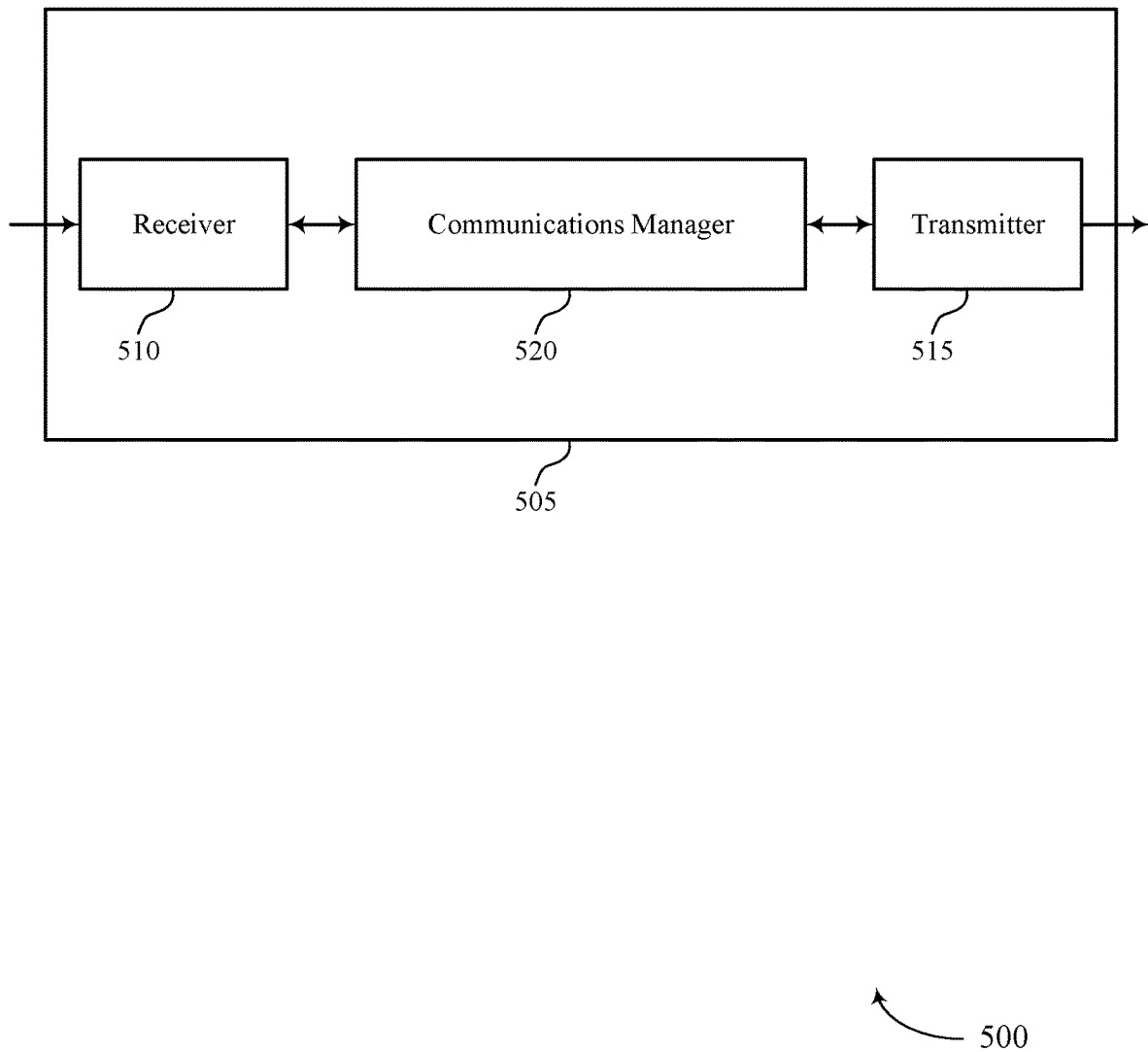
FIGS. 5 and 6 show block diagrams of devices that support security techniques for ranging in wireless networks in accordance with aspects of the present disclosure.

FIG. 5 shows a block diagram 500 of a device 505 that supports security techniques for ranging in wireless networks in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to security techniques for ranging in wireless networks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to security techniques for ranging in wireless networks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of security techniques for ranging in wireless networks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device in accordance with examples as disclosed herein. For example, the communications manager 520 may be configured as or otherwise support a means for transmitting, to a set of multiple devices, an indication to perform a ranging procedure with a second device, the set of multiple devices including the second device and one or more third devices. The communications manager 520 may be configured as or otherwise support a means for receiving signaling from the second device as part of the ranging procedure, where the first device determines an estimated location metric associated with the second device based on the received signaling. The communications manager 520 may be configured as or otherwise support a means for receiving, from each of the one or more third devices and based on performing the ranging procedure, a respective indication of a location metric for the second device relative to the each of the one or more third devices. The communications manager 520 may be configured as or otherwise support a means for communicating with the second device based on the one or more respective indications of the location metric for the second device relative to the each of the one or more third devices.

Additionally or alternatively, the communications manager 520 may support wireless communication at a third device in accordance with examples as disclosed herein. For example, the communications manager 520 may be configured as or otherwise support a means for receiving, from a first device, an indication for a set of multiple devices to perform a ranging procedure with a second device, the set of multiple devices including the second device and one or more third devices that include the third device. The communications manager 520 may be configured as or otherwise support a means for receiving signaling from the second device as part of the ranging procedure, where a location metric associated with the second device is determined based on the received signaling. The communications manager 520 may be configured as or otherwise support a means for transmitting, to the first device and based on performing the ranging procedure, an indication of the location metric associated with the second device.

The actions performed by the communications manager 520, among other examples herein, may be implemented to realize one or more potential advantages. For example, communications manager 520 may increase security at a wireless device (e.g., a UE 115) by supporting identification of an eavesdropper, which may also increase communication quality at the wireless device. The increase in security may result in increased link performance based on identifying the eavesdropper. Accordingly, communications manager 520 may increase security at a wireless device (e.g., a UE 115) by strategically supporting identification of an eavesdropper at a wireless device (e.g., a UE 115).

Figure 6:
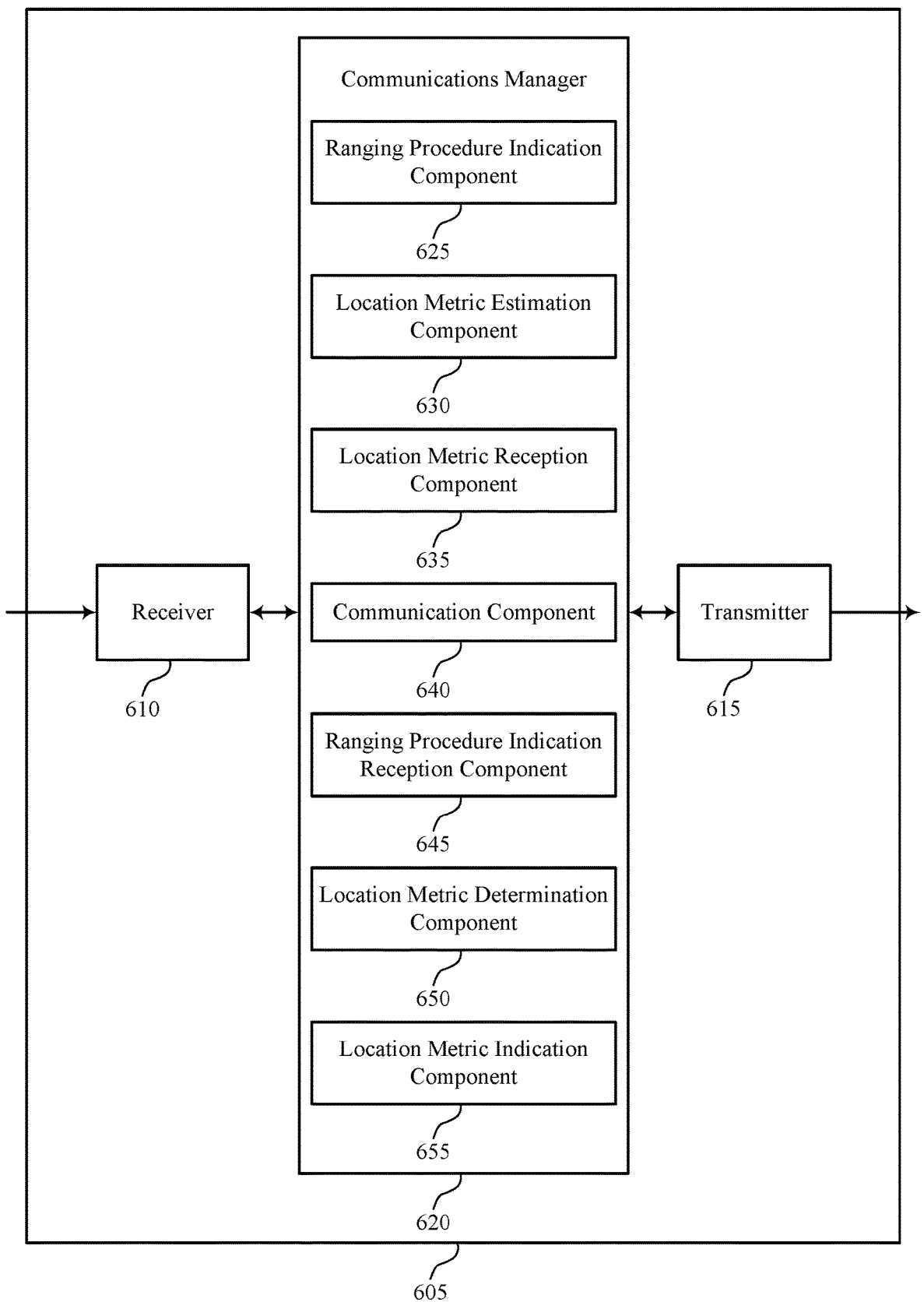

FIG. 6 shows a block diagram 600 of a device 605 that supports security techniques for ranging in wireless networks in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to security techniques for ranging in wireless networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to security techniques for ranging in wireless networks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of security techniques for ranging in wireless networks as described herein. For example, the communications manager 620 may include a ranging procedure indication component 625, a location metric estimation component 630, a location metric reception component 635, a communication component 640, a ranging procedure indication reception component 645, a location metric determination component 650, a location metric indication component 655, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. The ranging procedure indication component 625 may be configured as or otherwise support a means for transmitting, to a set of multiple devices, an indication to perform a ranging procedure with a second device, the set of multiple devices including the second device and one or more third devices. The location metric estimation component 630 may be configured as or otherwise support a means for receiving signaling from the second device as part of the ranging procedure, where the first device determines an estimated location metric associated with the second device based on the received signaling. The location metric reception component 635 may be configured as or otherwise support a means for receiving, from each of the one or more third devices and based on performing the ranging procedure, a respective indication of a location metric for the second device relative to the each of the one or more third devices. The communication component 640 may be configured as or otherwise support a means for communicating with the second device based on the one or more respective indications of the location metric for the second device relative to the each of the one or more third devices.

Additionally or alternatively, the communications manager 620 may support wireless communication at a third device in accordance with examples as disclosed herein. The ranging procedure indication reception component 645 may be configured as or otherwise support a means for receiving, from a first device, an indication for a set of multiple devices to perform a ranging procedure with a second device, the set of multiple devices including the second device and one or more third devices that include the third device. The location metric determination component 650 may be configured as or otherwise support a means for receiving signaling from the second device as part of the ranging procedure, where a location metric associated with the second device is determined based on the received signaling. The location metric indication component 655 may be configured as or otherwise support a means for transmitting, to the first device and based on performing the ranging procedure, an indication of the location metric associated with the second device.

A processor of a wireless device (e.g., controlling the receiver 610, the transmitter 615, or the transceiver 815 as described with reference to FIG. 8) may increase security and communication quality. The security may be increased (e.g., via implementation of system components described with reference to FIG. 7) compared to other systems and techniques, for example, that do not eavesdropper identification techniques. Further, the processor of the wireless device may identify one or more aspects of a location metric of another device, which may result in increased security at the wireless device (e.g., by strategically identifying an eavesdropper using the location metric), among other benefits.

Figure 7:
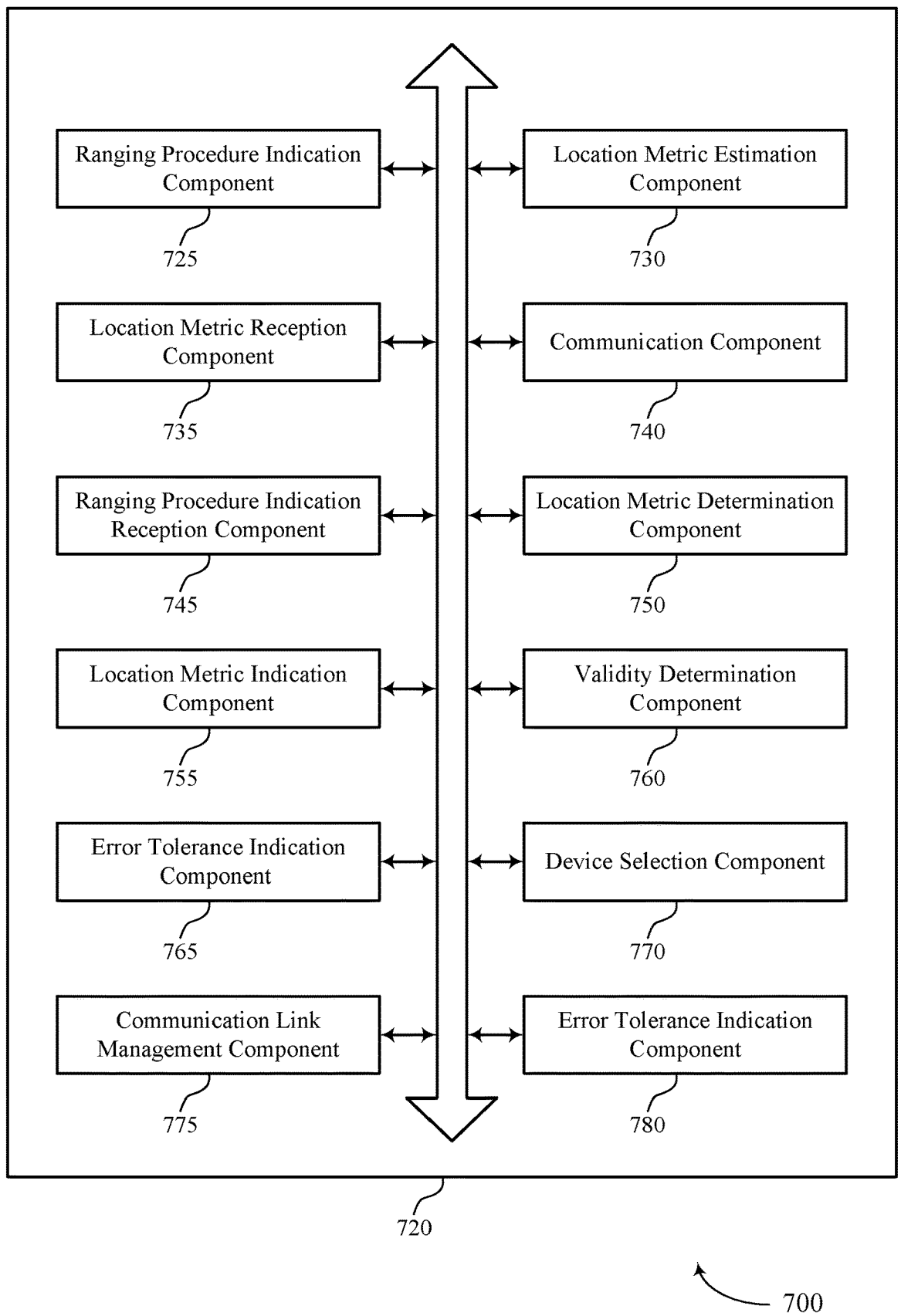
FIG. 7 shows a block diagram of a communications manager that supports security techniques for ranging in wireless networks in accordance with aspects of the present disclosure.

FIG. 7 shows a block diagram 700 of a communications manager 720 that supports security techniques for ranging in wireless networks in accordance with aspects of the present disclosure. The communications manager 720 may be an example of aspects of a communications manager 520, a communications manager 620, or both, as described herein. The communications manager 720, or various components thereof, may be an example of means for performing various aspects of security techniques for ranging in wireless networks as described herein. For example, the communications manager 720 may include a ranging procedure indication component 725, a location metric estimation component 730, a location metric reception component 735, a communication component 740, a ranging procedure indication reception component 745, a location metric determination component 750, a location metric indication component 755, a validity determination component 760, an error tolerance indication component 765, a device selection component 770, a communication link management component 775, an error tolerance indication component 780, or any combination thereof. Each of these components may communicate, directly or indirectly, with one another (e.g., via one or more buses).

The communications manager 720 may support wireless communication at a first device in accordance with examples as disclosed herein. The ranging procedure indication component 725 may be configured as or otherwise support a means for transmitting, to a set of multiple devices, an indication to perform a ranging procedure with a second device, the set of multiple devices including the second device and one or more third devices. The location metric estimation component 730 may be configured as or otherwise support a means for receiving signaling from the second device as part of the ranging procedure, where the first device determines an estimated location metric associated with the second device based on the received signaling. The location metric reception component 735 may be configured as or otherwise support a means for receiving, from each of the one or more third devices and based on performing the ranging procedure, a respective indication of a location metric for the second device relative to the each of the one or more third devices. The communication component 740 may be configured as or otherwise support a means for communicating with the second device based on the one or more respective indications of the location metric for the second device relative to the each of the one or more third devices.

In some examples, the validity determination component 760 may be configured as or otherwise support a means for determining a validity of the estimated location metric associated with the second device based on the one or more respective indications of the location metric for the second device relative to the each of the one or more third devices, where the communicating is based on the determined validity of the estimated location metric associated with the second device.

In some examples, the error tolerance indication component 765 may be configured as or otherwise support a means for receiving, from a network device, an indication of an expected location metric associated with the second device and an error tolerance for the expected location metric associated with the second device. In some examples, the validity determination component 760 may be configured as or otherwise support a means for determining whether the estimated location metric associated with the second device is within the error tolerance of the expected location metric associated with the second device based on determining the estimated location metric.

In some examples, the validity determination component 760 may be configured as or otherwise support a means for determining that the estimated location metric associated with the second device is within the error tolerance of the expected location metric associated with the second device. In some examples, the validity determination component 760 may be configured as or otherwise support a means for determining that the estimated location metric associated with the second device is valid based on determining that the estimated location metric associated with the second device is within the error tolerance of the expected location metric associated with the second device.

In some examples, to support receiving the respective indication of the location metric for the second device from the one or more third devices, the location metric reception component 735 may be configured as or otherwise support a means for receiving, from each of the one or more third devices, a respective indication of whether the location metric is within a respective error tolerance of a respective expected location metric associated with the second device.

In some examples, the validity determination component 760 may be configured as or otherwise support a means for determining that the estimated location metric associated with the second device is outside of the error tolerance of the expected location metric associated with the second device. In some examples, the validity determination component 760 may be configured as or otherwise support a means for determining that the estimated location metric associated with the second device is valid based on a first quantity of the one or more respective indications from the one or more third devices indicating that the location metric for the second device is outside of the respective error tolerance of the respective expected location metric associated with the second device.

In some examples, the validity determination component 760 may be configured as or otherwise support a means for determining that the estimated location metric associated with the second device is outside of the error tolerance of the expected location metric associated with the second device. In some examples, the validity determination component 760 may be configured as or otherwise support a means for determining that the estimated location metric associated with the second device is invalid based on a second quantity of the one or more respective indications from the one or more third devices indicating that the location metric for the second device is within the respective error tolerance of the respective expected location metric associated with the second device.

In some examples, the validity determination component 760 may be configured as or otherwise support a means for determining that the estimated location metric associated with the second device is invalid based on the one or more respective indications from the one or more third devices. In some examples, the device selection component 770 may be configured as or otherwise support a means for selecting one or more fourth devices to be included in the set of multiple devices based on determining that the estimated location metric associated with the second device is invalid, the one or more fourth devices selected based on different devices of the one or more fourth devices being located in different directions from the second device.

In some examples, the validity determination component 760 may be configured as or otherwise support a means for determining that the estimated location metric associated with the second device is invalid based on the one or more respective indications from the one or more third devices. In some examples, the device selection component 770 may be configured as or otherwise support a means for selecting one or more fourth devices to be included in the set of multiple devices based on determining that the estimated location metric associated with the second device is invalid, each of the one or more fourth devices selected randomly from a set of devices associated with a shared key.

In some examples, the validity determination component 760 may be configured as or otherwise support a means for determining that the estimated location metric associated with the second device is invalid based on the one or more respective indications from the one or more third devices. In some examples, the communication link management component 775 may be configured as or otherwise support a means for dropping one or more communication links with the set of multiple devices based on determining that the estimated location metric associated with the second device is invalid.

In some examples, the location metric estimation component 730 may be configured as or otherwise support a means for performing, based on dropping the one or more communication links, a second ranging procedure with the set of multiple devices at a time offset from dropping the one or more communication links, the second ranging procedure based on a key shared by the set of multiple devices.

In some examples, the validity determination component 760 may be configured as or otherwise support a means for determining that the estimated location metric associated with the second device is invalid based on the one or more respective indications from the one or more third devices. In some examples, the location metric estimation component 730 may be configured as or otherwise support a means for performing, based on determining that the estimated location metric associated with the second device is invalid, a second ranging procedure with the set of multiple devices, where signaling for the second ranging procedure is based on a key shared by the set of multiple devices.

In some examples, to support receiving the respective indication of the location metric associated with the second device from the one or more third devices, the location metric reception component 735 may be configured as or otherwise support a means for receiving, from each of the one or more third devices, a respective indication of a distance between the first device and the second device.

In some examples, the location metric estimation component 730 may be configured as or otherwise support a means for combining the estimated location metric associated with the second device with the one or more indicated distances between the first device and the second device, where the estimated location metric associated with the second device is a distance between the first device and the second device.

In some examples, the ranging procedure indication component 725 may be configured as or otherwise support a means for transmitting, to the set of multiple devices, a request to use shortened signaling for the ranging procedure, where the shortened signaling is based on a key shared by the set of multiple devices. In some examples, the ranging procedure indication component 725 may be configured as or otherwise support a means for transmitting, to the set of multiple devices, a request to use a quantity of repetitions of the shortened signaling for the ranging procedure, a request to use the key for randomization of the shortened signaling, or any combination thereof.

In some examples, a location metric associated with the second device includes a distance to the second device, an angle of arrival of signaling from the second device, an angle of departure of signaling to the second device, or any combination thereof.

Additionally or alternatively, the communications manager 720 may support wireless communication at a third device in accordance with examples as disclosed herein. The ranging procedure indication reception component 745 may be configured as or otherwise support a means for receiving, from a first device, an indication for a set of multiple devices to perform a ranging procedure with a second device, the set of multiple devices including the second device and one or more third devices that include the third device. The location metric determination component 750 may be configured as or otherwise support a means for receiving signaling from the second device as part of the ranging procedure, where a location metric associated with the second device is determined based on the received signaling. The location metric indication component 755 may be configured as or otherwise support a means for transmitting, to the first device and based on performing the ranging procedure, an indication of the location metric associated with the second device.

In some examples, the error tolerance indication component 780 may be configured as or otherwise support a means for receiving, from a network device, an indication of an expected location metric associated with the second device and an error tolerance for the expected location metric associated with the second device, where transmitting the indication of the location metric associated with the second device is based on the error tolerance for the expected location metric associated with the second device.

In some examples, to support transmitting the indication of the location metric associated with the second device, the location metric indication component 755 may be configured as or otherwise support a means for transmitting an indication of whether the location metric associated with the second device is within the error tolerance of the expected location metric associated with the second device.

In some examples, to support transmitting the indication of the location metric associated with the second device, the location metric indication component 755 may be configured as or otherwise support a means for transmitting, to the first device, an indication of a distance between the first device and the second device.

Figure 8:
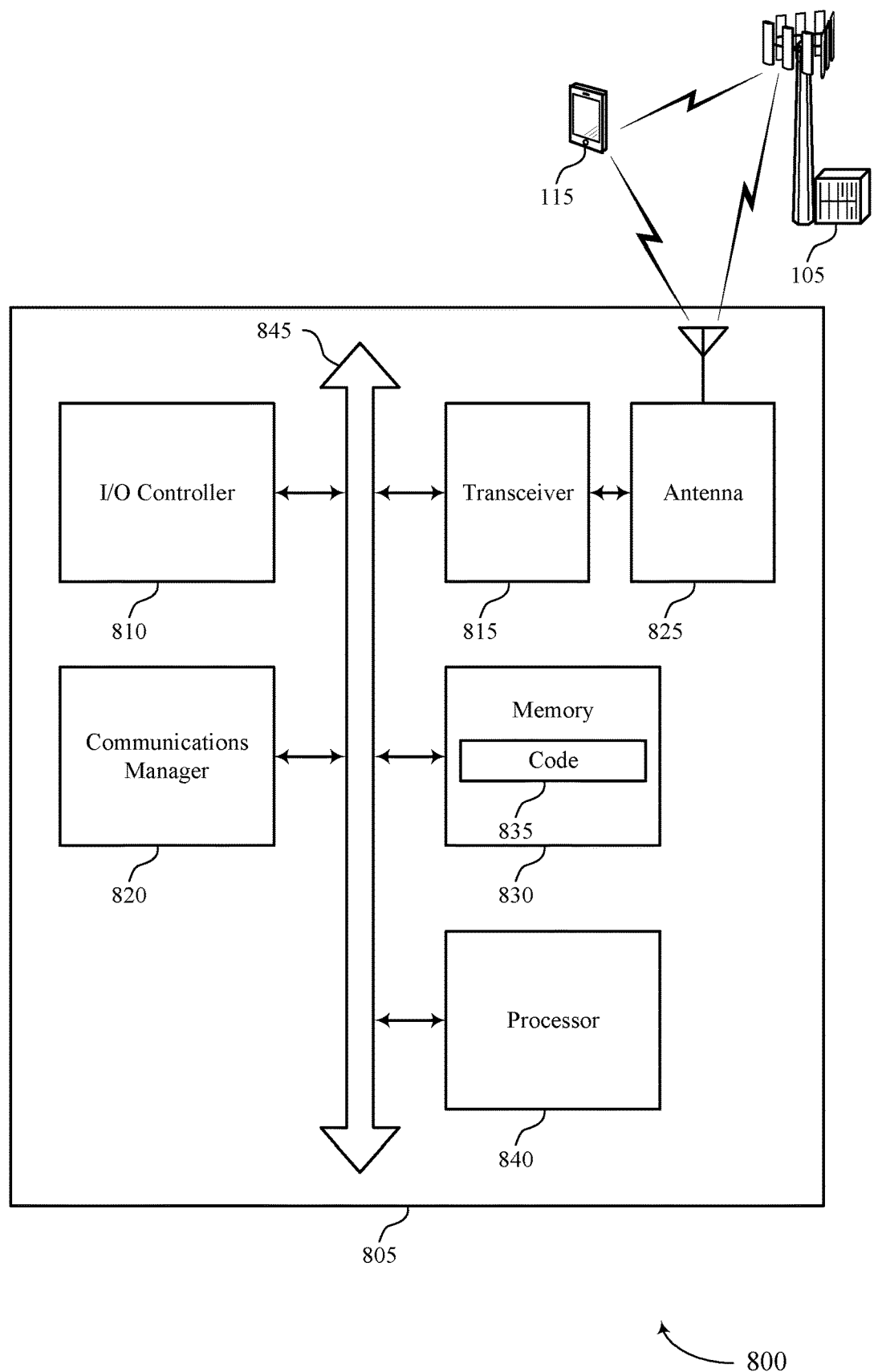
FIG. 8 shows a diagram of a system including a device that supports security techniques for ranging in wireless networks in accordance with aspects of the present disclosure.

FIG. 8 shows a diagram of a system 800 including a device 805 that supports security techniques for ranging in wireless networks in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting security techniques for ranging in wireless networks). For example, the device 805 or a component of the device 805 may include a processor 840 and memory 830 coupled to the processor 840, the processor 840 and memory 830 configured to perform various functions described herein.

The communications manager 820 may support wireless communication at a first device in accordance with examples as disclosed herein. For example, the communications manager 820 may be configured as or otherwise support a means for transmitting, to a set of multiple devices, an indication to perform a ranging procedure with a second device, the set of multiple devices including the second device and one or more third devices. The communications manager 820 may be configured as or otherwise support a means for receiving signaling from the second device as part of the ranging procedure, where the first device determines an estimated location metric associated with the second device based on the received signaling. The communications manager 820 may be configured as or otherwise support a means for receiving, from each of the one or more third devices and based on performing the ranging procedure, a respective indication of a location metric for the second device relative to the each of the one or more third devices. The communications manager 820 may be configured as or otherwise support a means for communicating with the second device based on the one or more respective indications of the location metric for the second device relative to the each of the one or more third devices.

Additionally or alternatively, the communications manager 820 may support wireless communication at a third device in accordance with examples as disclosed herein. For example, the communications manager 820 may be configured as or otherwise support a means for receiving, from a first device, an indication for a set of multiple devices to perform a ranging procedure with a second device, the set of multiple devices including the second device and one or more third devices that include the third device. The communications manager 820 may be configured as or otherwise support a means for receiving signaling from the second device as part of the ranging procedure, where a location metric associated with the second device is determined based on the received signaling. The communications manager 820 may be configured as or otherwise support a means for transmitting, to the first device and based on performing the ranging procedure, an indication of the location metric associated with the second device.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of security techniques for ranging in wireless networks as described herein, or the processor 840 and the memory 830 may be otherwise configured to perform or support such operations.

Figure 9:
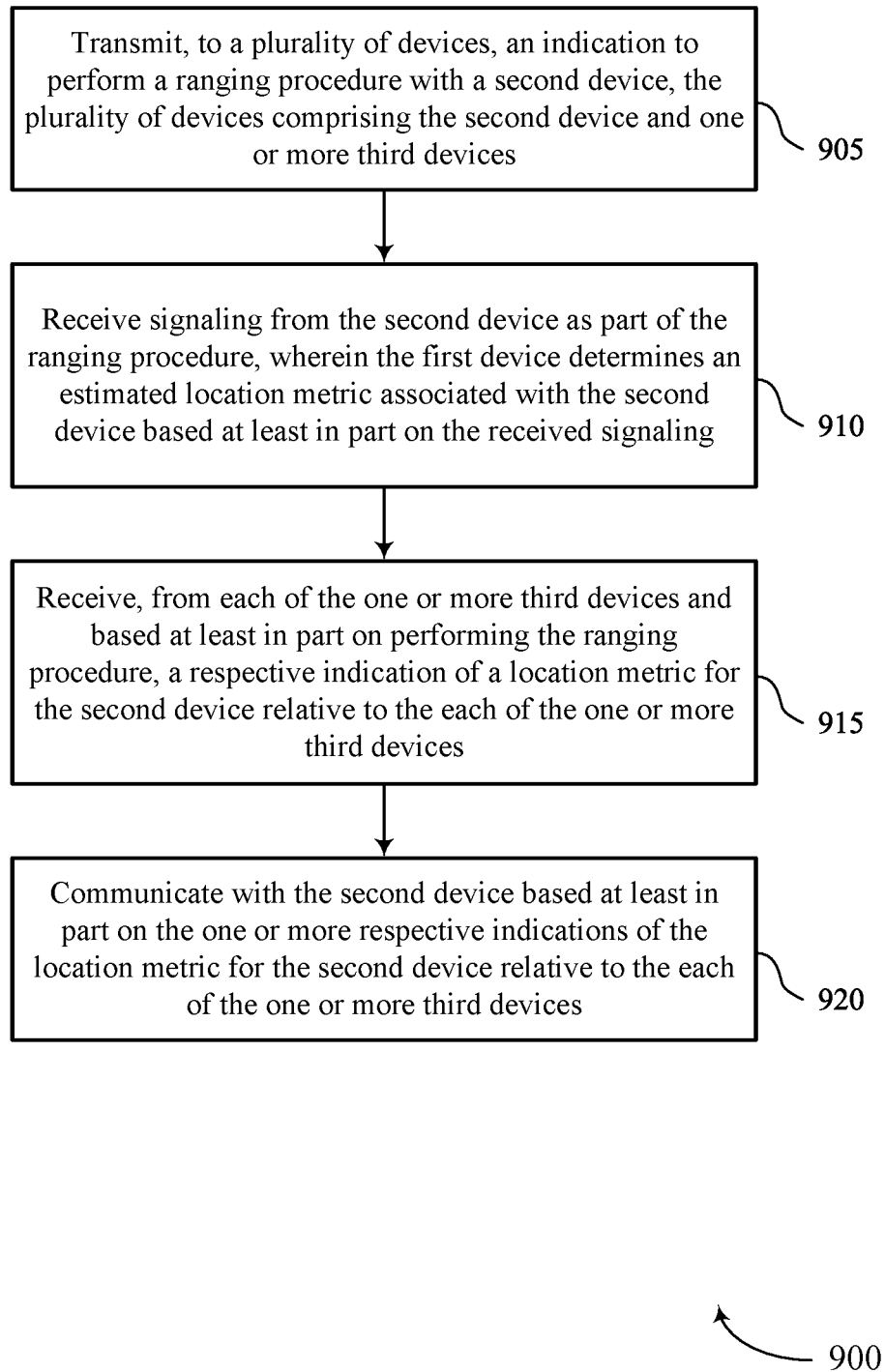
FIGS. 9 through 11 show flowcharts illustrating methods that support security techniques for ranging in wireless networks in accordance with aspects of the present disclosure.

FIG. 9 shows a flowchart illustrating a method 900 that supports security techniques for ranging in wireless networks in accordance with aspects of the present disclosure. The operations of the method 900 may be implemented by a UE or its components as described herein (e.g., a first device). For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include transmitting, to a set of multiple devices, an indication to perform a ranging procedure with a second device, the set of multiple devices including the second device and one or more third devices. The operations of 905 may be performed in accordance with examples as disclosed herein. In some examples, aspects of the operations of 905 may be performed by a ranging procedure indication component 725 as described with reference to FIG. 7.

At 910, the method may include receiving signaling from the second device as part of the ranging procedure, where the first device determines an estimated location metric associated with the second device based on the received signaling. The operations of 910 may be performed in accordance with examples as disclosed herein. In some examples, aspects of the operations of 910 may be performed by a location metric estimation component 730 as described with reference to FIG. 7.

At 915, the method may include receiving, from each of the one or more third devices and based on performing the ranging procedure, a respective indication of a location metric for the second device relative to the each of the one or more third devices. The operations of 915 may be performed in accordance with examples as disclosed herein. In some examples, aspects of the operations of 915 may be performed by a location metric reception component 735 as described with reference to FIG. 7.

At 920, the method may include communicating with the second device based on the one or more respective indications of the location metric for the second device relative to the each of the one or more third devices. The operations of 920 may be performed in accordance with examples as disclosed herein. In some examples, aspects of the operations of 920 may be performed by a communication component 740 as described with reference to FIG. 7.

Figure 10:
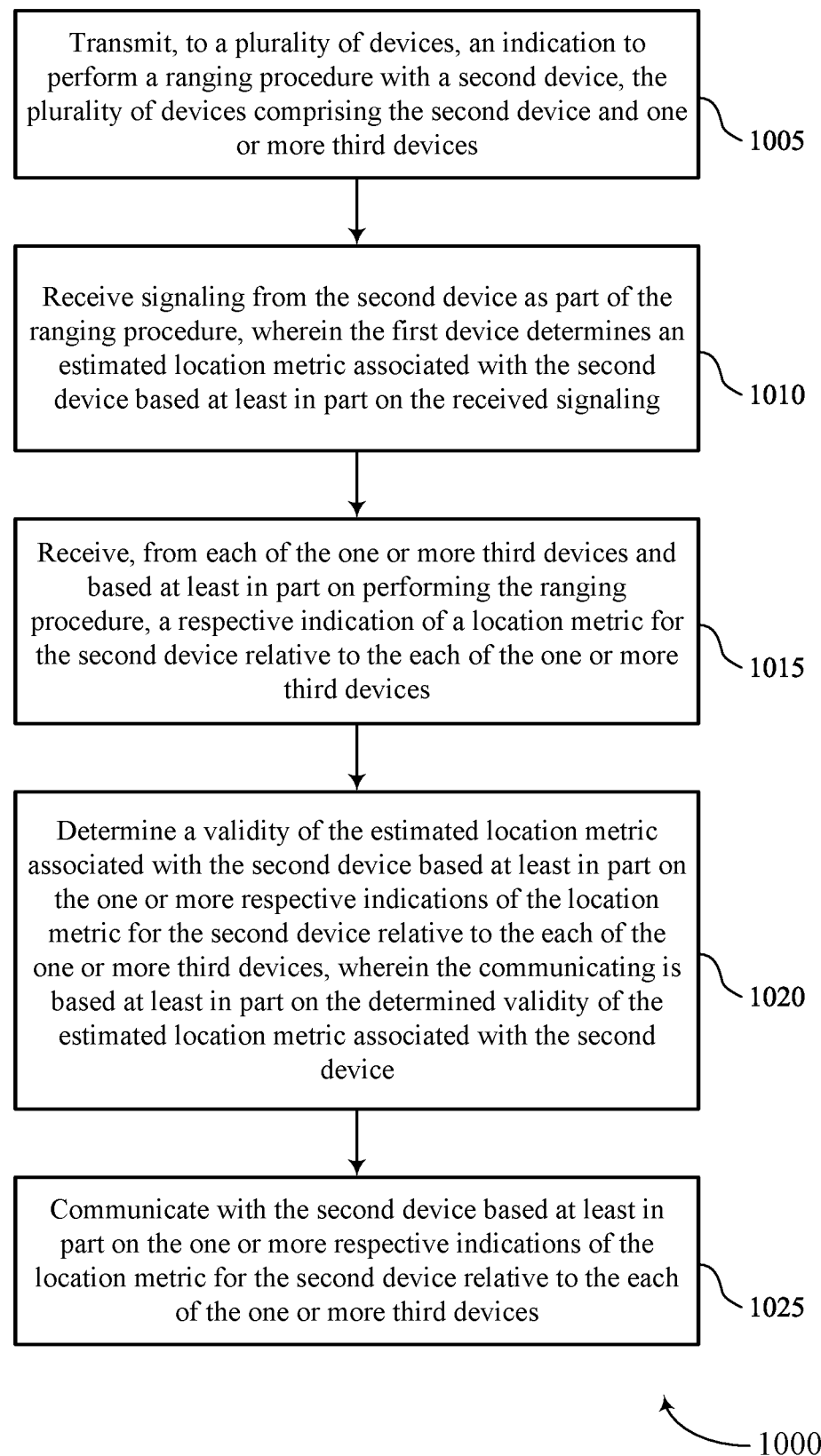

FIG. 10 shows a flowchart illustrating a method 1000 that supports security techniques for ranging in wireless networks in accordance with aspects of the present disclosure. The operations of the method 1000 may be implemented by a UE or its components as described herein (e.g., a first device). For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include transmitting, to a set of multiple devices, an indication to perform a ranging procedure with a second device, the set of multiple devices including the second device and one or more third devices. The operations of 1005 may be performed in accordance with examples as disclosed herein. In some examples, aspects of the operations of 1005 may be performed by a ranging procedure indication component 725 as described with reference to FIG. 7.

At 1010, the method may include receiving signaling from the second device as part of the ranging procedure, where the first device determines an estimated location metric associated with the second device based on the received signaling. The operations of 1010 may be performed in accordance with examples as disclosed herein. In some examples, aspects of the operations of 1010 may be performed by a location metric estimation component 730 as described with reference to FIG. 7.

At 1015, the method may include receiving, from each of the one or more third devices and based on performing the ranging procedure, a respective indication of a location metric for the second device relative to the each of the one or more third devices. The operations of 1015 may be performed in accordance with examples as disclosed herein. In some examples, aspects of the operations of 1015 may be performed by a location metric reception component 735 as described with reference to FIG. 7.

At 1020, the method may include determining a validity of the estimated location metric associated with the second device based on the one or more respective indications of the location metric for the second device relative to the each of the one or more third devices, where the communicating is based on the determined validity of the estimated location metric associated with the second device. The operations of 1020 may be performed in accordance with examples as disclosed herein. In some examples, aspects of the operations of 1020 may be performed by a validity determination component 760 as described with reference to FIG. 7.

At 1025, the method may include communicating with the second device based on the one or more respective indications of the location metric for the second device relative to the each of the one or more third devices. The operations of 1025 may be performed in accordance with examples as disclosed herein. In some examples, aspects of the operations of 1025 may be performed by a communication component 740 as described with reference to FIG. 7.

Figure 11:
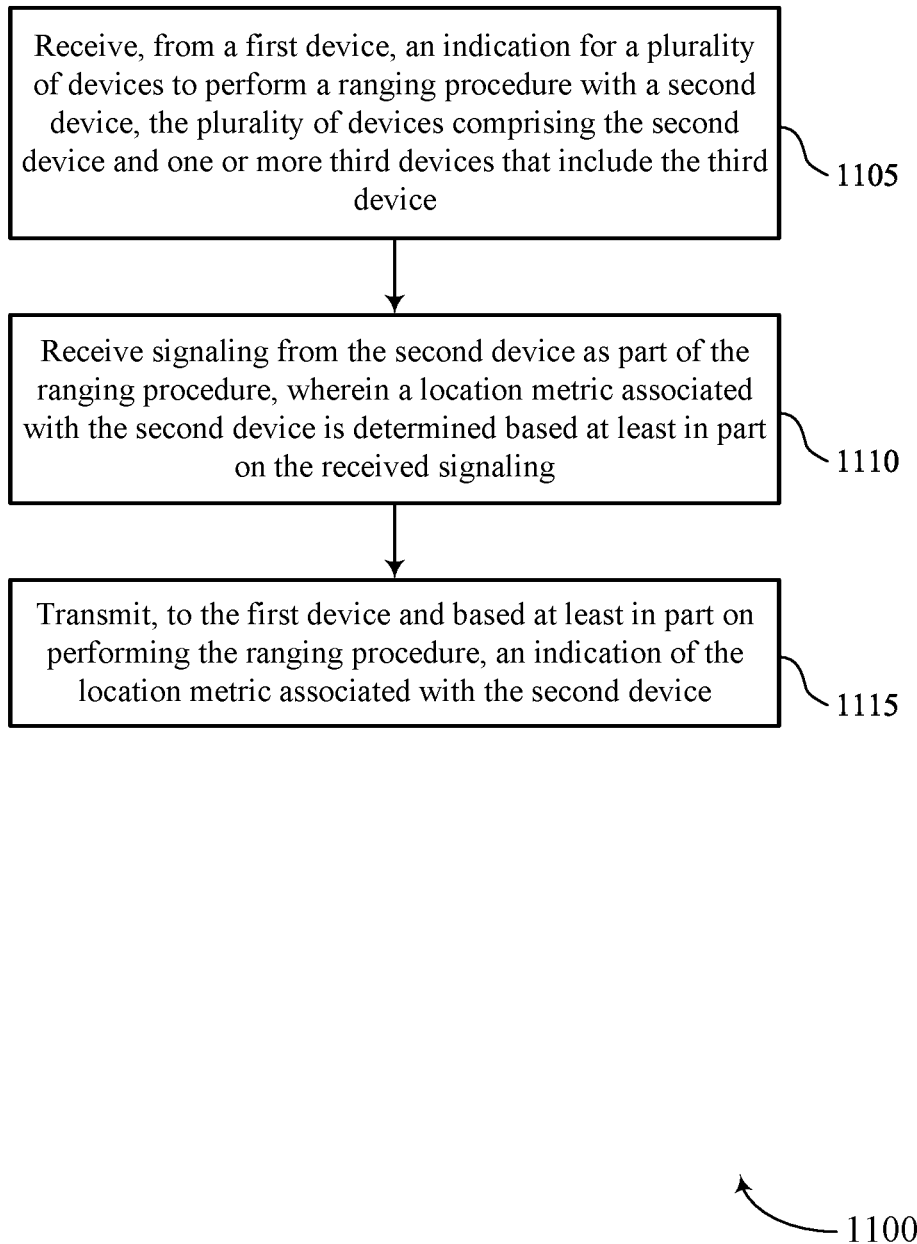

FIG. 11 shows a flowchart illustrating a method 1100 that supports security techniques for ranging in wireless networks in accordance with aspects of the present disclosure. The operations of the method 1100 may be implemented by a UE or its components as described herein (e.g., a third device). For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a first device, an indication for a set of multiple devices to perform a ranging procedure with a second device, the set of multiple devices including the second device and one or more third devices that include the third device. The operations of 1105 may be performed in accordance with examples as disclosed herein. In some examples, aspects of the operations of 1105 may be performed by a ranging procedure indication reception component 745 as described with reference to FIG. 7.

At 1110, the method may include receiving signaling from the second device as part of the ranging procedure, where a location metric associated with the second device is determined based on the received signaling. The operations of 1110 may be performed in accordance with examples as disclosed herein. In some examples, aspects of the operations of 1110 may be performed by a location metric determination component 750 as described with reference to FIG. 7.

At 1115, the method may include transmitting, to the first device and based on performing the ranging procedure, an indication of the location metric associated with the second device. The operations of 1115 may be performed in accordance with examples as disclosed herein. In some examples, aspects of the operations of 1115 may be performed by a location metric indication component 755 as described with reference to FIG. 7.

The following provides an overview of aspects of the present disclosure:

Aspect 1: A method for wireless communication at a first device, comprising: transmitting, to a plurality of devices, an indication to perform a ranging procedure with a second device, the plurality of devices comprising the second device and one or more third devices; receiving signaling from the second device as part of the ranging procedure, wherein the first device determines an estimated location metric associated with the second device based at least in part on the received signaling; receiving, from each of the one or more third devices and based at least in part on performing the ranging procedure, a respective indication of a location metric for the second device relative to the each of the one or more third devices; and communicating with the second device based at least in part on the one or more respective indications of the location metric for the second device relative to the each of the one or more third devices.

Aspect 2: The method of aspect 1, further comprising: determining a validity of the estimated location metric associated with the second device based at least in part on the one or more respective indications of the location metric for the second device relative to the each of the one or more third devices, wherein the communicating is based at least in part on the determined validity of the estimated location metric associated with the second device.

Aspect 3: The method of any of aspects 1 through 2, further comprising: receiving, from a network device, an indication of an expected location metric associated with the second device and an error tolerance for the expected location metric associated with the second device; and determining whether the estimated location metric associated with the second device is within the error tolerance of the expected location metric associated with the second device based at least in part on determining the estimated location metric.

Aspect 4: The method of aspect 3, further comprising: determining that the estimated location metric associated with the second device is within the error tolerance of the expected location metric associated with the second device; and determining that the estimated location metric associated with the second device is valid based at least in part on determining that the estimated location metric associated with the second device is within the error tolerance of the expected location metric associated with the second device.

Aspect 5: The method of any of aspects 3 through 4, wherein receiving the respective indication of the location metric for the second device from the one or more third devices comprises: receiving, from each of the one or more third devices, a respective indication of whether the location metric is within a respective error tolerance of a respective expected location metric associated with the second device.

Aspect 6: The method of aspect 5, further comprising: determining that the estimated location metric associated with the second device is outside of the error tolerance of the expected location metric associated with the second device; and determining that the estimated location metric associated with the second device is valid based at least in part on a first quantity of the one or more respective indications from the one or more third devices indicating that the location metric for the second device is outside of the respective error tolerance of the respective expected location metric associated with the second device.

Aspect 7: The method of aspect 5, further comprising: determining that the estimated location metric associated with the second device is outside of the error tolerance of the expected location metric associated with the second device; and determining that the estimated location metric associated with the second device is invalid based at least in part on a second quantity of the one or more respective indications from the one or more third devices indicating that the location metric for the second device is within the respective error tolerance of the respective expected location metric associated with the second device.

Aspect 8: The method of any of aspects 1 through 3, 5, and 7, further comprising: determining that the estimated location metric associated with the second device is invalid based at least in part on the one or more respective indications from the one or more third devices; and selecting one or more fourth devices to be included in the plurality of devices based at least in part on determining that the estimated location metric associated with the second device is invalid, the one or more fourth devices selected based at least in part on different devices of the one or more fourth devices being located in different directions from the second device.

Aspect 9: The method of any of aspects 1 through 3, 5, 7, and 8, further comprising: determining that the estimated location metric associated with the second device is invalid based at least in part on the one or more respective indications from the one or more third devices; and selecting one or more fourth devices to be included in the plurality of devices based at least in part on determining that the estimated location metric associated with the second device is invalid, each of the one or more fourth devices selected randomly from a set of devices associated with a shared key.

Aspect 10: The method of any of aspects 1 through 3, 5, and 7 through 9, further comprising: determining that the estimated location metric associated with the second device is invalid based at least in part on the one or more respective indications from the one or more third devices; and dropping one or more communication links with the plurality of devices based at least in part on determining that the estimated location metric associated with the second device is invalid.

Aspect 11: The method of aspect 10, further comprising: performing, based at least in part on dropping the one or more communication links, a second ranging procedure with the plurality of devices at a time offset from dropping the one or more communication links, the second ranging procedure based at least in part on a key shared by the plurality of devices.

Aspect 12: The method of any of aspects 1 through 3, 5, and 7 through 11, further comprising: determining that the estimated location metric associated with the second device is invalid based at least in part on the one or more respective indications from the one or more third devices; and performing, based at least in part on determining that the estimated location metric associated with the second device is invalid, a second ranging procedure with the plurality of devices, wherein signaling for the second ranging procedure is based at least in part on a key shared by the plurality of devices.

Aspect 13: The method of any of aspects 1 through 12, wherein receiving the respective indication of the location metric associated with the second device from the one or more third devices comprises: receiving, from each of the one or more third devices, a respective indication of a distance between the first device and the second device.

Aspect 14: The method of aspect 13, further comprising: combining the estimated location metric associated with the second device with the one or more indicated distances between the first device and the second device, wherein the estimated location metric associated with the second device is a distance between the first device and the second device.

Aspect 15: The method of any of aspects 1 through 14, further comprising: transmitting, to the plurality of devices, a request to use shortened signaling for the ranging procedure, wherein the shortened signaling is based at least in part on a key shared by the plurality of devices.

Aspect 16: The method of aspect 15, further comprising: transmitting, to the plurality of devices, a request to use a quantity of repetitions of the shortened signaling for the ranging procedure, a request to use the key for randomization of the shortened signaling, or any combination thereof.

Aspect 17: The method of any of aspects 1 through 16, wherein a location metric associated with the second device comprises a distance to the second device, an angle of arrival of signaling from the second device, an angle of departure of signaling to the second device, or any combination thereof.

Aspect 18: A method for wireless communication at a third device, comprising: receiving, from a first device, an indication for a plurality of devices to perform a ranging procedure with a second device, the plurality of devices comprising the second device and one or more third devices that include the third device; receiving signaling from the second device as part of the ranging procedure, wherein a location metric associated with the second device is determined based at least in part on the received signaling; and transmitting, to the first device and based at least in part on performing the ranging procedure, an indication of the location metric associated with the second device.

Aspect 19: The method of aspect 18, further comprising: receiving, from a network device, an indication of an expected location metric associated with the second device and an error tolerance for the expected location metric associated with the second device, wherein transmitting the indication of the location metric associated with the second device is based at least in part on the error tolerance for the expected location metric associated with the second device.

Aspect 20: The method of aspect 19, wherein transmitting the indication of the location metric associated with the second device comprises: transmitting an indication of whether the location metric associated with the second device is within the error tolerance of the expected location metric associated with the second device.

Aspect 21: The method of any of aspects 18 through 20, wherein transmitting the indication of the location metric associated with the second device comprises: transmitting, to the first device, an indication of a distance between the first device and the second device.

Aspect 22: An apparatus for wireless communication at a first device, comprising a processor; memory coupled with the processor; and instructions stored in the memory and executable by the processor to cause the apparatus to perform a method of any of aspects 1 through 17.

Aspect 23: An apparatus for wireless communication at a first device, comprising at least one means for performing a method of any of aspects 1 through 17.

Aspect 24: A non-transitory computer-readable medium storing code for wireless communication at a first device, the code comprising instructions executable by a processor to perform a method of any of aspects 1 through 17.

Aspect 25: An apparatus for wireless communication at a third device, comprising a processor; memory coupled with the processor; and instructions stored in the memory and executable by the processor to cause the apparatus to perform a method of any of aspects 18 through 21.

Aspect 26: An apparatus for wireless communication at a third device, comprising at least one means for performing a method of any of aspects 18 through 21.

Aspect 27: A non-transitory computer-readable medium storing code for wireless communication at a third device, the code comprising instructions executable by a processor to perform a method of any of aspects 18 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   a processor; and
   memory coupled with the processor, wherein the memory comprises instructions executable by the processor to cause the apparatus to:
      transmit, to a plurality of devices, an indication to perform a ranging procedure with a second device, the plurality of devices comprising the second device and one or more third devices;
      receive signaling from the second device as part of the ranging procedure, wherein the first device determines an estimated location metric associated with the second device based at least in part on the received signaling;
      receive, from each of the one or more third devices and based at least in part on performing the ranging procedure, a respective indication of a location metric for the second device relative to the each of the one or more third devices; and
      communicate with the second device based at least in part on the one or more respective indications of the location metric for the second device relative to the each of the one or more third devices.

2. The apparatus of claim 1, wherein the instructions are further executable by the processor to cause the apparatus to:
   determine a validity of the estimated location metric associated with the second device based at least in part on the one or more respective indications of the location metric for the second device relative to the each of the one or more third devices, wherein the communicating is based at least in part on the determined validity of the estimated location metric associated with the second device.

3. The apparatus of claim 1, wherein the instructions are further executable by the processor to cause the apparatus to:
   receive, from a network device, an indication of an expected location metric associated with the second device and an error tolerance for the expected location metric associated with the second device; and
   determine whether the estimated location metric associated with the second device is within the error tolerance of the expected location metric associated with the second device based at least in part on determining the estimated location metric.

4. The apparatus of claim 3, wherein the instructions are further executable by the processor to cause the apparatus to:
   determine that the estimated location metric associated with the second device is within the error tolerance of the expected location metric associated with the second device; and
   determine that the estimated location metric associated with the second device is valid based at least in part on determining that the estimated location metric associated with the second device is within the error tolerance of the expected location metric associated with the second device.

5. The apparatus of claim 3, wherein the instructions to receive the respective indication of the location metric for the second device from the one or more third devices are executable by the processor to cause the apparatus to:

receive, from each of the one or more third devices, a respective indication of whether the location metric is within a respective error tolerance of a respective expected location metric associated with the second device.

6. The apparatus of claim 5, wherein the instructions are further executable by the processor to cause the apparatus to:
determine that the estimated location metric associated with the second device is outside of the error tolerance of the expected location metric associated with the second device; and
determine that the estimated location metric associated with the second device is valid based at least in part on a first quantity of the one or more respective indications from the one or more third devices indicating that the location metric for the second device is outside of the respective error tolerance of the respective expected location metric associated with the second device.

7. The apparatus of claim 5, wherein the instructions are further executable by the processor to cause the apparatus to:
determine that the estimated location metric associated with the second device is outside of the error tolerance of the expected location metric associated with the second device; and
determine that the estimated location metric associated with the second device is invalid based at least in part on a second quantity of the one or more respective indications from the one or more third devices indicating that the location metric for the second device is within the respective error tolerance of the respective expected location metric associated with the second device.

8. The apparatus of claim 1, wherein the instructions are further executable by the processor to cause the apparatus to:
determine that the estimated location metric associated with the second device is invalid based at least in part on the one or more respective indications from the one or more third devices; and
select one or more fourth devices to be included in the plurality of devices based at least in part on determining that the estimated location metric associated with the second device is invalid, the one or more fourth devices selected based at least in part on different devices of the one or more fourth devices being located in different directions from the second device.

9. The apparatus of claim 1, wherein the instructions are further executable by the processor to cause the apparatus to:
determine that the estimated location metric associated with the second device is invalid based at least in part on the one or more respective indications from the one or more third devices; and
select one or more fourth devices to be included in the plurality of devices based at least in part on determining that the estimated location metric associated with the second device is invalid, each of the one or more fourth devices selected randomly from a set of devices associated with a shared key.

10. The apparatus of claim 1, wherein the instructions are further executable by the processor to cause the apparatus to:
determine that the estimated location metric associated with the second device is invalid based at least in part on the one or more respective indications from the one or more third devices; and
drop one or more communication links with the plurality of devices based at least in part on determining that the estimated location metric associated with the second device is invalid.

11. The apparatus of claim 10, wherein the instructions are further executable by the processor to cause the apparatus to:
perform, based at least in part on dropping the one or more communication links, a second ranging procedure with the plurality of devices at a time offset from dropping the one or more communication links, the second ranging procedure based at least in part on a key shared by the plurality of devices.

12. The apparatus of claim 1, wherein the instructions are further executable by the processor to cause the apparatus to:
determine that the estimated location metric associated with the second device is invalid based at least in part on the one or more respective indications from the one or more third devices; and
perform, based at least in part on determining that the estimated location metric associated with the second device is invalid, a second ranging procedure with the plurality of devices, wherein signaling for the second ranging procedure is based at least in part on a key shared by the plurality of devices.

13. The apparatus of claim 1, wherein the instructions to receive the respective indication of the location metric associated with the second device from the one or more third devices are executable by the processor to cause the apparatus to:
receive, from each of the one or more third devices, a respective indication of a distance between the first device and the second device.

14. The apparatus of claim 13, wherein the instructions are further executable by the processor to cause the apparatus to:
combine the estimated location metric associated with the second device with the one or more indicated distances between the first device and the second device, wherein the estimated location metric associated with the second device is a distance between the first device and the second device.

15. The apparatus of claim 1, wherein the instructions are further executable by the processor to cause the apparatus to:
transmit, to the plurality of devices, a request to use shortened signaling for the ranging procedure, wherein the shortened signaling is based at least in part on a key shared by the plurality of devices.

16. The apparatus of claim 15, wherein the instructions are further executable by the processor to cause the apparatus to:
transmit, to the plurality of devices, a request to use a quantity of repetitions of the shortened signaling for the ranging procedure, a request to use the key for randomization of the shortened signaling, or any combination thereof.

17. The apparatus of claim 1, wherein a location metric associated with the second device comprises a distance to the second device, an angle of arrival of signaling from the second device, an angle of departure of signaling to the second device, or any combination thereof.

18. An apparatus for wireless communication at a third device, comprising:
a processor; and
memory coupled with the processor, wherein the memory comprises instructions executable by the processor to cause the apparatus to:
receive, from a first device, an indication for a plurality of devices to perform a ranging procedure with a second device, the plurality of devices comprising the second device and one or more third devices that include the third device;

receive signaling from the second device as part of the ranging procedure, wherein a location metric associated with the second device is determined based at least in part on the received signaling;
receive, from a network device, an indication of an expected location metric associated with the second device and an error tolerance for the expected location metric associated with the second device; and
transmit, to the first device and based at least in part on performing the ranging procedure, an indication of the location metric associated with the second device based at least in part on the error tolerance for the expected location metric associated with the second device.

19. The apparatus of claim 18, wherein the instructions to transmit the indication of the location metric associated with the second device are executable by the processor to cause the apparatus to:
transmit an indication of whether the location metric associated with the second device is within the error tolerance of the expected location metric associated with the second device.

20. The apparatus of claim 18, wherein the instructions to transmit the indication of the location metric associated with the second device are executable by the processor to cause the apparatus to:
transmit, to the first device, an indication of a distance between the first device and the second device.

21. A method for wireless communication at a first device, comprising:
transmitting, to a plurality of devices, an indication to perform a ranging procedure with a second device, the plurality of devices comprising the second device and one or more third devices;
receiving signaling from the second device as part of the ranging procedure, wherein the first device determines an estimated location metric associated with the second device based at least in part on the received signaling;
receiving, from each of the one or more third devices and based at least in part on performing the ranging procedure, a respective indication of a location metric for the second device relative to the each of the one or more third devices; and
communicating with the second device based at least in part on the one or more respective indications of the location metric for the second device relative to the each of the one or more third devices.

22. The method of claim 21, further comprising:
determining a validity of the estimated location metric associated with the second device based at least in part on the one or more respective indications of the location metric for the second device relative to the each of the one or more third devices, wherein the communicating is based at least in part on the determined validity of the estimated location metric associated with the second device.

23. The method of claim 21, further comprising:
receiving, from a network device, an indication of an expected location metric associated with the second device and an error tolerance for the expected location metric associated with the second device; and
determining whether the estimated location metric associated with the second device is within the error tolerance of the expected location metric associated with the second device based at least in part on determining the estimated location metric.

24. The method of claim 23, wherein receiving the respective indication of the location metric for the second device from the one or more third devices comprises:
receiving, from each of the one or more third devices, a respective indication of whether the location metric is within a respective error tolerance of a respective expected location metric associated with the second device.

25. The method of claim 21, wherein receiving the respective indication of the location metric associated with the second device from the one or more third devices comprises:
receiving, from each of the one or more third devices, a respective indication of a distance between the first device and the second device.

26. A method for wireless communication at a third device, comprising:
receiving, from a first device, an indication for a plurality of devices to perform a ranging procedure with a second device, the plurality of devices comprising the second device and one or more third devices that include the third device;
receiving signaling from the second device as part of the ranging procedure, wherein a location metric associated with the second device is determined based at least in part on the received signaling;
receiving, from a network device, an indication of an expected location metric associated with the second device and an error tolerance for the expected location metric associated with the second device; and
transmitting, to the first device and based at least in part on performing the ranging procedure, an indication of the location metric associated with the second device based at least in part on the error tolerance for the expected location metric associated with the second device.

27. The method of claim 26, wherein transmitting the indication of the location metric associated with the second device comprises:
transmitting an indication of whether the location metric associated with the second device is within the error tolerance of the expected location metric associated with the second device.

28. The method of claim 26, wherein transmitting the indication of the location metric associated with the second device comprises:
transmitting, to the first device, an indication of a distance between the first device and the second device.

* * * * *